(12) United States Patent
Rowlette

(10) Patent No.: US 10,502,934 B2
(45) Date of Patent: *Dec. 10, 2019

(54) INFRARED REFRACTIVE OBJECTIVE LENS ASSEMBLY

(71) Applicant: DAYLIGHT SOLUTIONS, INC., San Diego, CA (US)

(72) Inventor: Jeremy Rowlette, Escondido, CA (US)

(73) Assignee: DAYLIGHT SOLUTIONS, INC., San Diego, CA (US)

(*) Notice: Subject to any disclaimer, the term of this patent is extended or adjusted under 35 U.S.C. 154(b) by 110 days.

This patent is subject to a terminal disclaimer.

(21) Appl. No.: 15/796,684

(22) Filed: Oct. 27, 2017

(65) Prior Publication Data

US 2018/0045926 A1 Feb. 15, 2018

Related U.S. Application Data

(63) Continuation of application No. 14/773,054, filed as application No. PCT/US2014/033878 on Apr. 11, 2014, now Pat. No. 9,823,451.

(Continued)

(51) Int. Cl.
*G02B 13/14* (2006.01)
*G02B 21/02* (2006.01)
(Continued)

(52) U.S. Cl.
CPC .............. *G02B 13/14* (2013.01); *G02B 9/60* (2013.01); *G02B 21/02* (2013.01); *G02B 21/26* (2013.01); *G02B 27/0062* (2013.01)

(58) Field of Classification Search
CPC ... G02B 9/00; G02B 9/12; G02B 9/34; G02B 9/58; G02B 9/60; G02B 9/62;
(Continued)

(56) References Cited

U.S. PATENT DOCUMENTS 3,391,974 A 7/1968 Ride et al.
3,796,220 A 3/1974 Bredemeier
(Continued)

FOREIGN PATENT DOCUMENTS

EP 2194409 A3 6/2010
GB 1141779 A 1/1969
(Continued)

OTHER PUBLICATIONS

Office Action from the State Intellectual Property Office (SIPO) for application serial No. 2016-507695, dated Apr. 3, 2018. (This is the corresponding application in China for the instant U.S. Application). A non-formal, translation of the office action is being provided.

(Continued)

*Primary Examiner* — Arnel C Lavarias
(74) *Attorney, Agent, or Firm* — Roeder & Broder LLP; Steven G. Roeder

(57) ABSTRACT

A mid-infrared objective lens assembly (10) includes a plurality of spaced apart, refractive lens elements (20) that operate in the mid-infrared spectral range, the plurality of lens elements (20) including an aplanatic first lens element (26) that is closest to an object (14) to be observed. The first lens element (26) has a forward surface (36) that faces the object (14) and a rearward surface (38) that faces away from the object (14). The forward surface (36) can have a radius of curvature that is negative.

24 Claims, 14 Drawing Sheets

Related U.S. Application Data

(60) Provisional application No. 61/811,548, filed on Apr. 12, 2013.

(51) Int. Cl.
*G02B 9/60* (2006.01)
*G02B 21/26* (2006.01)
*G02B 27/00* (2006.01)

(58) Field of Classification Search
CPC .. G02B 13/001; G02B 13/005; G02B 13/008; G02B 13/14; G02B 21/02; G02B 21/025; G02B 27/0025; G02B 27/005; G02B 27/0062
USPC ....... 359/350, 354, 355, 356, 357, 368, 369, 359/379, 380, 432, 656, 658, 65, 9, 660, 359/661, 676, 683, 694, 754, 756, 761, 359/763, 770, 771, 781, 7, 82, 784, 792
See application file for complete search history.

(56) References Cited

U.S. PATENT DOCUMENTS

| | | | |
|---|---|---|---|
| 4,184,737 A | 1/1980 | Hirschberg | |
| 4,450,460 A | 5/1984 | Morimoto | |
| 4,595,829 A | 6/1986 | Neiimann | |
| 5,118,945 A | 6/1992 | Winschuh et al. | |
| 5,156,943 A | 10/1992 | Whitney | |
| 5,202,792 A | 4/1993 | Rollin | |
| 5,208,648 A | 5/1993 | Batchelder et al. | |
| 5,220,403 A | 6/1993 | Batchelder et al. | |
| 5,225,678 A | 7/1993 | Messerschmidt | |
| 5,260,965 A | 11/1993 | Nakazeki et al. | |
| 5,311,021 A | 5/1994 | Messerschmidt | |
| 5,865,829 A | 2/1999 | Kitajima | |
| 5,880,880 A | 3/1999 | Anderson et al. | |
| 5,894,122 A | 4/1999 | Tomita | |
| 5,907,431 A | 5/1999 | Stuttler | |
| 5,920,432 A | 7/1999 | Suenaga et al. | |
| 5,973,827 A | 10/1999 | Chipper | |
| 5,995,283 A | 11/1999 | Anderson et al. | |
| 6,016,226 A | 1/2000 | Arisawa | |
| 6,069,744 A | 5/2000 | Kusaka et al. | |
| 6,076,929 A | 6/2000 | Stuttler | |
| 6,094,300 A | 7/2000 | Kashima et al. | |
| 6,181,480 B1 | 1/2001 | Ito | |
| 6,387,715 B1 | 5/2002 | Davis et al. | |
| 6,437,913 B1 | 8/2002 | Kishi | |
| 6,501,603 B2 | 12/2002 | Kasahara | |
| 6,747,804 B2 | 6/2004 | Fujimoto et al. | |
| 6,975,129 B2 | 12/2005 | Chang | |
| 7,009,171 B2 | 3/2006 | Sasaki | |
| 7,009,763 B1 | 3/2006 | Wolleschensky | |
| 7,069,985 B2 | 7/2006 | Wang | |
| 7,158,310 B2 | 1/2007 | Sakakura et al. | |
| 7,180,661 B2 | 2/2007 | Sasaki | |
| 7,193,424 B2 | 3/2007 | Chang | |
| 7,196,843 B2 | 3/2007 | Nakata | |
| 7,223,986 B2 | 5/2007 | Natori | |
| 7,233,437 B2 | 6/2007 | Hirata et al. | |
| 7,582,870 B2 | 9/2009 | Lee et al. | |
| 7,643,216 B2 | 1/2010 | Winterot et al. | |
| 7,646,542 B2 | 1/2010 | Yonetani | |
| 7,663,807 B2 | 2/2010 | Yonetani | |
| 7,672,057 B2 | 3/2010 | Shi et al. | |
| 7,675,676 B2 | 3/2010 | Nakata | |
| 7,855,831 B2 | 12/2010 | Wolleschensky et al. | |
| 7,876,505 B1 | 1/2011 | Olczak | |
| 7,894,131 B2 | 2/2011 | Kubo | |
| 7,902,523 B2 | 3/2011 | Motomura | |
| 7,907,348 B2 | 3/2011 | Shi et al. | |
| 7,915,575 B2 | 3/2011 | Yokoi | |
| 7,965,450 B2 | 6/2011 | Yonetani | |
| 8,780,347 B2 | 7/2014 | Kotidis et al. | |
| 9,823,451 B2 * | 11/2017 | Rowlette | G02B 13/14 |
| 2003/0197924 A1 | 10/2003 | Nakata | |
| 2004/0178334 A1 | 9/2004 | Sasaki | |
| 2004/0178356 A1 | 9/2004 | Natori | |
| 2004/0245445 A1 | 12/2004 | Suzuki | |
| 2004/0262522 A1 | 12/2004 | Kitahara et al. | |
| 2005/0030054 A1 | 2/2005 | Chang | |
| 2005/0072913 A1 | 4/2005 | Lange et al. | |
| 2005/0122579 A1 | 6/2005 | Sasaki | |
| 2005/0194126 A1 | 9/2005 | Wang | |
| 2005/0269510 A1 | 12/2005 | Chang | |
| 2005/0270641 A1 | 12/2005 | Hirata et al. | |
| 2007/0139753 A1 | 6/2007 | Nakata | |
| 2008/0018966 A1 | 1/2008 | Dubois et al. | |
| 2008/0192339 A1 | 8/2008 | Kubo | |
| 2008/0290293 A1 | 11/2008 | Motomura | |
| 2008/0304047 A1 | 12/2008 | Lee et al. | |
| 2009/0108187 A1 | 4/2009 | Yokoi | |
| 2009/0109527 A1 | 4/2009 | Sasaki et al. | |
| 2010/0079857 A1 | 4/2010 | Sasaki et al. | |
| 2010/0118396 A1 | 5/2010 | Nakata | |
| 2010/0172021 A1 | 6/2010 | Suzuki | |
| 2011/0113516 A1 | 5/2011 | Fink et al. | |
| 2011/0134521 A1 | 6/2011 | Truong et al. | |
| 2011/0248166 A1 | 10/2011 | Diem et al. | |
| 2012/0033220 A1 | 2/2012 | Kotidis et al. | |
| 2012/0075693 A1 | 3/2012 | Kim | |
| 2012/0223260 A1 | 9/2012 | Hansen et al. | |
| 2013/0057751 A1 | 3/2013 | Ohtake et al. | |
| 2014/0253714 A1 | 9/2014 | Weida | |

FOREIGN PATENT DOCUMENTS

| | | |
|---|---|---|
| JP | H10221596 A | 8/1998 |
| JP | 2001521635 A | 11/2001 |
| KR | 101235579 B1 | 3/2013 |
| WO | WO9845744 A2 | 10/1998 |
| WO | WO200488386 A1 | 10/2004 |
| WO | WO2009109979 A2 | 9/2009 |
| WO | WO2012140083 A1 | 10/2012 |
| WO | WO2013063316 A1 | 5/2013 |
| WO | WO2014209471 A2 | 12/2014 |

OTHER PUBLICATIONS

Brochure for LaserScope IR Microscope, pp. 1-2, Block Engineering, 2011.
Brochure for Nicolet Continuum Infrared Microscope, pp. 1-12, Thermo Fisher Scientific, 2011.
Nasse, et al., High Resolution Fourier-transform infrared chemical imaging with multiple synchrotron beams, Nature Methods, vol. 8, No. 5, pp. 413-416, May 2011.
Phillips, et al. Infrared hyperspectral imaging using a broadly tunable external cavity quantum cascade laser and microbolometer focal plane array, Optics Express, vol. 16., No. 3, Feb. 4, 2008.
Li, et al., Recent Development of Ultra Small Pixel Uncooled Focal Plane Arrays at DRS, SPIE vol. 6542, pp. 65421Y-1 to 65421Y-12, Aug. 2011.
The International Search Report and Written Opinion of the International Searching Authority for PCT/US2012/061987, Daylight Solutions, Inc., dated Feb. 11, 2013 (related application).
The International Preliminary Report on Patentability, dated Apr. 29, 2014, Daylight Solutions, Inc., PCT/US2012/061987.
The International Preliminary Report on Patentability, dated Feb. 18, 2015, Daylight Solutions, Inc., PCT/US2014/033878.
International Preliminary Report on Patentability and Written Opinion of the International Searching Authority, PCT/US2014/033878, dated Oct. 13, 2015.
Supplementary European Search Report from the European Patent Office, 14817948.4, dated Feb. 8, 2017.
James P.C. Southall et al, "Aplantic (or 1-15 Cartesian) optical surfaces", Journal of the Franklin Institute, vol. 193, No. 5, May 1, 1922, pp. 609-626.

* cited by examiner

INFRARED REFRACTIVE OBJECTIVE LENS ASSEMBLY

RELATED INVENTION

This application is a continuation application of U.S. application Ser. No. 14/773,054, filed Sep. 4, 2015 and entitled "INFRARED REFRACTIVE OBJECTIVE LENS ASSEMBLY". As far as permitted, the contents of U.S. application Ser. No. 14/773,054 are incorporated herein by reference.

U.S. application Ser. No. 14/773,054 is a 371 of PCT/US14/33878, filed Apr. 11, 2014, and entitled "INFRARED REFRACTIVE OBJECTIVE LENS ASSEMBLY". As far as permitted, the contents of PCT/US14/33878 are incorporated herein by reference.

PCT/US14/33878 claims priority on U.S. Provisional Application Ser. No. 61/811,548, filed Apr. 12, 2013 and entitled "INFRARED REFRACTIVE OBJECTIVE LENS ASSEMBLY". As far as permitted, the contents of U.S. Provisional Application Ser. No. 61/811,548 are incorporated herein by reference.

GOVERNMENT SPONSORED DEVELOPMENT

The U.S. Government has rights in this invention pursuant to contract number NSF SBIR Phase I Award No: IIP-1230424 and Phase II Award No: IIP-1046450 with the National Science Foundation.

BACKGROUND

Objective lens assemblies are commonly used in microscopes, telescopes, cameras and other devices for gathering light from an object being observed and focusing the light to form an image of the object. Objective lens assemblies that operate in visible spectrum of light are quite common.

Currently, the applicant of the present invention is developing a microscope that operates in the mid infrared ("MIR") light spectrum. Unfortunately, existing objective lens assemblies do not provide sufficient performance in the MIR light spectrum.

SUMMARY

The present invention is directed to a mid-infrared objective lens assembly that gathers mid-infrared light from an object positioned at an object plane and focuses the mid-infrared light onto an image plane. In one embodiment, the objective lens assembly includes a plurality of spaced apart, refractive lens elements that operate in the mid-infrared spectral range, the plurality of lens elements including an aplanatic first lens element that is closest to the object, the first lens element having a forward surface that faces the object and a rearward surface that faces away from the object, wherein the forward surface has a radius of curvature that is negative.

In one embodiment, the plurality of lens elements are spaced apart along an optical axis; the forward surface of the first lens element has a center of the curvature; and the first lens element is positioned so that the center of curvature is positioned on the optical axis, and is approximately at the object plane. Stated in another fashion, the forward surface of the first lens element is spaced apart from the object plane a front separation distance along the optical axis, and the front separation distance is approximately equal to the magnitude of the radius of curvature of the forward surface of the first lens element. In alternative, non-exclusive embodiments, the front separation distance is within approximately one, 0.9, 0.8, 0.7, 0.6, 0.5, 0.4, 0.3, 0.2, or 0.1 percent of the radius of curvature of the forward surface of the first lens element.

Moreover, in alternative, non-exclusive embodiments, the first lens element is made of a material having an index of refraction that is greater than 2, 2.5, or 3 for the mid-infrared spectral range. For example, the first lens element can be made of germanium. The use of a high index material is important for the first lens element to minimize achromatic aberrations.

Additionally, in certain embodiments, the object lens assembly includes three to ten lens elements, and at least two of the lens elements are made of different materials, and each of the lens elements is made of material that is selected from a group that includes germanium, zinc sulfide, zinc selenide, and silicon. Alternatively, three or four of the lens elements can be made of a different material.

As a non-exclusive example, the first lens element can be made of a first material having an infrared Abbe number that is greater than the infrared Abbe number for a second material of the second lens element.

In one embodiment, adjacent lens elements are spaced apart a separation distance along the optical axis, and the separation distance is either greater than 0.5 millimeters or less than five micrometers including the value of zero gap. It should be noted that the separation distance can be an air gap or can be filled with an adhesive or index matching fluid or polymer.

In another embodiment, the plurality of lens elements are arranged to include a front lens group and a rear lens group; and the front lens group is corrected for infinite image conjugate. Further, the rear lens group can include a first rear lens element and a second rear lens element that are spaced apart, and the rear lens elements are designed to achieve anomalous dispersion such that the effective focal length of the rear lens group decreases with increasing wavelength. In one embodiment, the first rear lens element has a positive optical power, and the second rear lens element has a negative optical power; the first rear lens element is made of a first material and the second rear lens element is made of a second material; and the first material has a lower dispersion or higher infrared Abbe number than the second material in the mid-infrared spectral range. For example, first material can be germanium and zinc sulfide or germanium and zinc selenide.

In one embodiment, the rearward surface of the first lens element has a radius of curvature R that approximately satisfies the aplanatic condition as defined by the expression: $R = -(\eta/(\eta+\eta'))*L$, where $\eta$ is the index of refraction of the first lens element, $\eta'$ is the index of refraction of the medium surrounding the lens element, and L is the physical distance from the vertex of the rearward surface and the on-axis object point which is the sum of the distance from the on-axis object point and the vertex of the forward surface of the first element and the center thickness of the first lens element.

In another embodiment, the center thickness, Lc, of each lens elements of the objective lens assembly adheres to the formula: $Lc > 1/(4*\eta)$ measured in units of centimeters, where $\eta$ is the average index of refraction over the mid-infrared operating band of the lens assembly.

In still another embodiment, the present invention is directed to a mid-infrared, refractive objective lens assembly having a RMS wavefront error of less than approximately 0.5 waves over a wavenumber range of 900-1800 $cm^{-1}$ band in the mid-infrared spectral range and over a field of view between 100 micrometers up to 2.0 millimeters.

In yet another embodiment, the present invention is directed to an infrared objective lens assembly wherein the plurality of lens elements are designed and arranged so that a ratio of a magnification factor of the lens assembly to a numerical aperture of the lens assembly is less than thirty.

Further, in alternative, non-exclusive embodiments, the objective lens assembly has a working distance of less than 100, 90, 80, 70, 60, or 50 millimeters.

In still another embodiment, the mid-infrared, objective lens assembly includes a plurality of spaced apart, refractive lens elements that operate in the mid-infrared spectral range, the plurality of lens elements including an aplanatic front lens element that is closest to the object, the front lens element having an optical axis, a forward surface that faces the object and a rearward surface that faces away from the object; the forward surface being spaced apart from the object a front separation distance along the optical axis. In this embodiment, a mover assembly moves at least one of the object and the front lens group of elements to adjust the front separation distance; and a control system controls the mover assembly to selectively adjust the front separation distance to reduce RMS wavefront error. Moreover, in this embodiment, a mid-infrared laser directs a laser beam that is within the mid-infrared spectral range at the object; and the control system controls the mover assembly to selectively adjust the front separation distance based on the wavelength of the laser beam in order to minimize RMS wavefront error.

As provided herein, the term "MIR spectral range" shall mean and include the range of wavelengths from approximately three to fifteen micrometers (3-15 μm).

Further, as used herein, the term "numerical aperture" ("NA") is a dimensionless number that characterizes the range of angles (an acceptance cone) in which the objective lens assembly can accept light from the object. Thus, the numerical aperture is an indication of the light gathering ability and the resolution of the objective lens assembly. The numerical aperture of the objective lens assembly is defined by the equation $NA=\eta \sin \theta$, where $\theta$ is the index of refraction of the medium in which the light travels between the object and the objective lens assembly (e.g. 1.00 for air), and $\theta$ is the half-angle of the maximum cone of light that can enter the objective lens assembly from the object. For a microscope application, the size of the finest resolved detail is proportional to $\lambda/2NA$, wherein $\lambda$ is the wavelength of light (e.g. in the MIR spectral range in this example) and NA is the numerical aperture of the objective lens assembly. Thus, an objective lens assembly with a larger numerical aperture will be able to provide finer detail than an objective lens assembly with a smaller numerical aperture. Further, an objective lens assembly with a larger numerical aperture will collect more light and the resulting image will be brighter.

As used herein, the term field of view ("FOV") refers to the extent of the object that can be seen at any given moment at the image plane. For a microscope application disclosed herein, the field of view is the diameter of the circle of light that is captured by the light sensing device at any given moment or the width of a rectangular region defined by the boundaries of the a light sensing device having a rectangular aperture. Generally speaking, the higher the magnification of the objective lens assembly, the smaller the field of view according to the formula $Wa/|Mt|$ where Wa is the physical width of the sensor array and $|Mt|$ is the magnitude of the transverse image magnification of the optical lens assembly. It is desirable to maximize the FOV provided that the spatial resolution is not compromised. There is a fundamental tradeoff between spatial resolution, optical throughput of the system, and FOV in classical microscopy systems.

The optical throughput of the microscope can be quantified by the amount of light striking the sensor located at the image plane. The throughput is proportional to the square of the ratio of the numerical aperture and the transverse image magnification, $(NA/Mt)^2$. It is desirable to maximize this quantity in order to ensure high signal-to-noise ratio (SNR). Since resolution is proportional to 1/NA and FOV is proportional to 1/Mt, we find that it is desirable to maximize NA and minimize Mt as much as possible to achieve the best system performance. However, as NA increases, one generally needs to increase Mt for two reasons. First, one needs to ensure that the rate of digital sampling at the image plane is sufficient to meet image quality requirements. Secondly, optical aberrations increase rapidly with increasing NA and FOV due to the increasing deviation from paraxial optical theory where the approximation $\sin(theta)\sim theta$ can be made, where theta is the angle a light ray makes with any given lens element surface.

To ensure a sufficient sampling rate is achieved, the sample-referred pixel size, Ws, given by the actual physical pixel size, Wp, divided by the magnitude of the transverse image magnification, $Ws=Wp/|Mt|$, should be at least approximately five times smaller than the Airy diameter which is given by 1.22*lambda/NA. For example, if NA=0.7 and lambda=6 um, then Ws should be less than or equal to 2 um. The present invention provides a way to push the limits of high NA and wide FOV for an optical lens assembly that operates in the mid-infrared spectrum.

BRIEF DESCRIPTION OF THE DRAWINGS

The novel features of this invention, its structure, and its operation, will be best understood from the accompanying drawings, taken in conjunction with the accompanying description, in which similar reference characters refer to similar parts, and in which.

DESCRIPTION

Figure 1A:
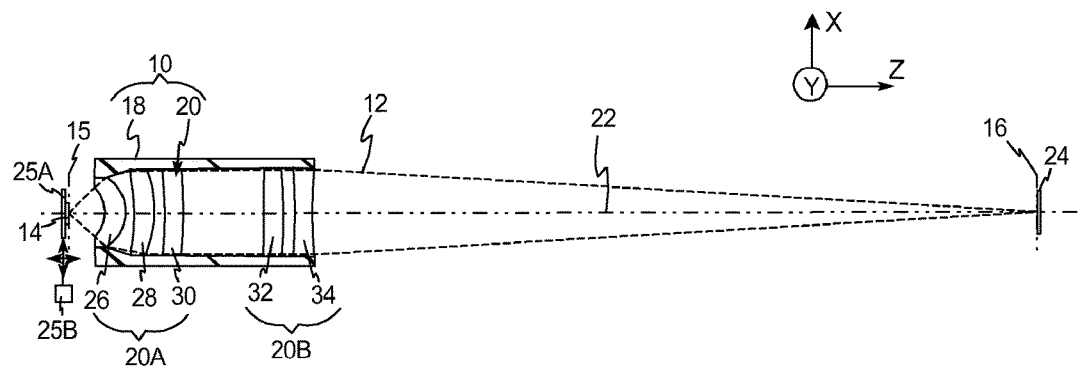
FIG. 1A is a simplified side view, in partial cut-away of an objective lens assembly having features of the present invention, and an object and an image plane.

Referring initially to FIG. 1A, in one embodiment, the present invention is directed to an objective lens assembly 10 that gathers light 12 (illustrated as dashed lines) from an object 14 (illustrated as a box) being observed that is located on an object plane 15, and focuses the light 12 to produce an image on an image plane 16 (often referred to as the system focal plane). In this embodiment, the lens assembly 10 includes a lens housing 18 (illustrated in cut-away, and a plurality of spaced apart, refractive lens elements 20 that are coupled and secured to the lens housing 18, and that aligned along an optical axis 22 of the lens assembly 10. Pursuant to the teachings provided herein, the design of the components of the lens assembly 10 can be varied to vary the performance of the lens assembly 10.

A number of Figures include an orientation system that illustrates an X axis, a Y axis that is orthogonal to the X axis, and a Z axis that is orthogonal to the X and Y axes. It should be noted that any of these axes can also be referred to as the first, second, and/or third axes. In FIG. 1A, the optical axis 22 is collinear with the Z axis, the object plane 15 is positioned parallel to the X and Y axes, the image plane 16 is positioned parallel to the X and Y axes, and the radial and phi vectors lie within the X-Y plane. In certain embodiments, the lens elements 20 and lens housing 18 are approximately axially symmetric and have a cylindrical symmetry about the optical axis 22.

For the purposes of illustration, drawings are oriented in such a way that the object 14 being imaged is to the left of the objective lens assembly 10 and the image plane 16 is to the right of the objective lens assembly 10. In this non-exclusive example, the light 12 travels from left to right to form an image at the image plane 16. Further, for ease of discussion, the lens elements 20 will be described object-wise to imagewise (from left to right) in the drawings.

As non-exclusive examples, the lens assembly 10 provided herein can be used for MIR imaging, MIR microscopy, MIR spectroscopy, MIR spectoscopic imaging, MIR microspectroscopic imaging, MIR cameras, MIR stand-off detection, and/or other optical instruments or can be simply used in bench-top scientific experiments requiring imaging or off-axis laser illumination. For example, in certain embodiments, a light sensing device 24 (illustrated as a box) can be positioned at the image plane 16 to capture an image of the light 12 gathered from the object 14. In one embodiment, the light sensing device 24 has a measurement band (e.g. senses light) in the MIR spectral range (or a predetermined desired portion thereof) to capture a MIR image of the light 12 collected from the object 14. Subsequently, the MIR image can be analyzed to determine one or more characteristics of the object 14 being observed.

In certain embodiments, the lens assembly 10 provided herein is uniquely designed to operate in the MIR spectral range (or a predetermined desired portion thereof), and is achromatic or substantially achromatic over the MIR spectral range (or a predetermined desired portion thereof) so that the effects of chromatic aberrations are reduced. Moreover, the lens assembly 10 is uniquely designed to minimize achromatic aberrations in order to maximize both a numerical aperture and a field of view over a substantial portion of the MIR spectral band. Further, the lens assembly 10 is uniquely designed to manage coherence effects through the use of (i) refractive lens elements 20 instead of reflective, (ii) engineered spacing between the lens elements 20 to ensure that any parasitic etalon free spectral range ("FSR") falls outside the measurement band of a spectral imaging system containing the objective assembly 24; and (iii) engineered optical thicknesses of lens elements 20 to ensure that parasitic etalon FSR (coherent effects) falls outside of measurement band of a spectral imaging system containing the objective assembly. As a result thereof, the image captured by the light sensing device 24 will have higher image quality, and spectral images will yield higher spectral fidelity as well as higher image quality.

Further, as provided herein, the present invention is directed to a refractive objective lens assembly 10 that is optimized for coherent light, in the MIR spectral range. In certain embodiments, the objective lens assembly 10 is particularly used in conjunction with a mid-infrared laser (not shown in FIG. 1A) that generates a coherent laser beam (not shown in FIG. 1A) that is in the MIR spectral range and that is directed at the object 14, and may traverse the objective lens assembly 10 prior to striking the object 14, as in the case of reflection mode imaging systems, or by striking the object 14 prior to the objective lens assembly 10 as in the case of transmission imaging systems. Depending upon the design, the refractive objective lens assembly 10 collects the light 12 that is either reflected off of or transmitted through the object 14 and images that light onto an imaging sensor 24 such as a focal plane array (FPA).

In certain embodiments, as non-exclusive examples, the objective lens assembly 12 can be optimized for (i) the entire MIR spectral range of approximately three to fifteen micrometers (3-15 µm); (ii) a predetermined desired range of approximately five and one-half to eleven micrometers (5.5-11 µm); (iii) a predetermined desired range of approximately six to ten micrometers (6-10 µm); (iv) a predetermined desired range of approximately eight to fourteen micrometers (8-14 µm); (v) a predetermined desired range of approximately seven to fourteen micrometers (7-14 µm); or (vi) a predetermined desired range of approximately three to eleven micrometers (3-11 µm). Importantly, with the teachings provided herein, the objective lens assembly 12 can be optimized for other predetermined desired ranges of the MIR spectral range than those provided above.

In certain embodiments, the refractive objective lens assembly 12 is high-resolution, has optimized performance under coherent laser illumination in the MIR spectral range, and achieves diffraction limited spatial resolution over a substantial fraction of the full field as is limited by the physical extent of the light sensing device 24 used to capture the image. Furthermore, the aberrations can be adequately suppressed, particularly for off-axis object field points such that diffraction-limited performance is achieved over the entire FOV.

Moreover, the refractive objective lens assemblies 12 provided herein, do not exhibit rapidly diminishing resolution with field position (i.e. object points removed from the center of field do not have degraded images). Further, the refractive objective lens assemblies 12 provided herein (i) eliminate the obscuration and sharp centralized apertures exhibited by available reflective objectives, and (ii) correct for imaging aberrations using multiple refractive lens elements 20. Additionally, the objective lens assembly 12 provided herein allows for the use of lower numerical aperture condenser optics than what are necessary in reflective Cassegrain objectives thereby increasing system light coupling efficiency and reducing the cost and complexity of the imaging system.

Figure 6A:
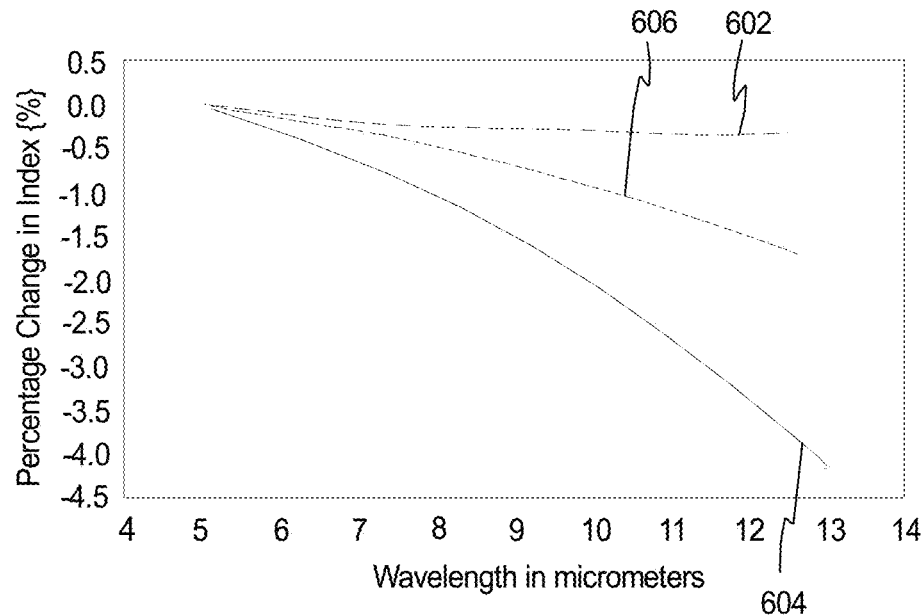
FIG. 6A illustrates the optical dispersion curves for germanium, zinc selenide, and zinc sulfide.
Figure 6B:
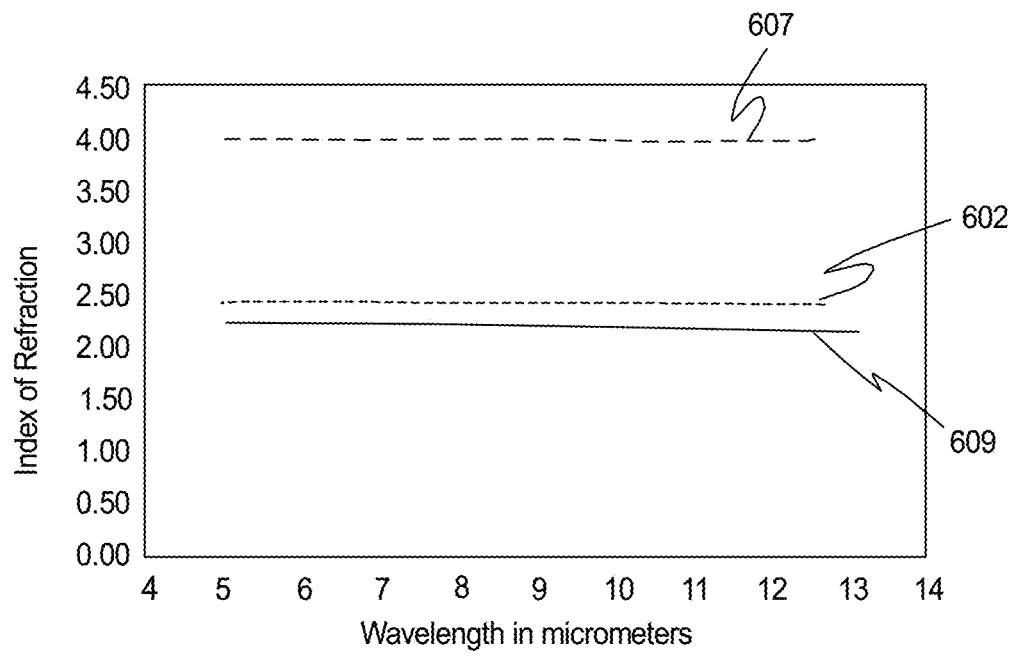
FIG. 6B illustrates the index of refraction curves for germanium, zinc selenide, and zinc sulfide.

Additionally, as provided herein, in order to push the limits of high NA and wide FOV, the latter being achieved by minimizing Mt (the transverse image magnification), the optical aberrations of the lens assembly must be minimized. This can be achieved through specific engineering of each lens element 20, including the lens material, the surface curvature, thickness, and spacing between elements. Ignoring environmental effects such as temperature and pressure, optical aberrations come in two basic varieties, chromatic and achromatic. Chromatic aberrations arise due to the index of refraction of a given material having wavelength dependence. How the index of refraction changes with wavelength is called a dispersion curve. FIG. 6A illustrates the optical dispersion curves for germanium 602, zinc selenide 604, and zinc sulfide 606 over the 5-11 micrometer range and FIG. 6B illustrates the index of refraction curves for germanium 607, zinc selenide 608, and zinc sulfide 609 over the 5-11 micrometer range. The index monotonically decreases with increasing wavelength for each of these materials. Though the trend is typical for most infrared glass materials, the magnitude and exact shape can vary substantially from one material to another. Each material has a unique dispersion curve and can be quantified by a single number called an Abbe number. Abbe numbers (Vd) are typically defined for the visible spectrum using the following formula: $Vd=(\eta D-1)/(nF-nC)$ where D, F, and C are the Fraunhofer D, F, and C spectral lines at 589.3 nm, 486.1 nm, and 656.3 nm respectively. In the infrared, we chose to define the Abbe number for the spectral range 5-11 um, using the same formula but by replacing D, F, and C wavelengths with infrared wavelengths of 8 um (D), 5 um (F) and 8 um (C). For example, germanium will have an infrared Abbe number of approximately 246 whereas zinc selenide will have an infrared Abbe number of approximately 48 and whereas zinc sulfide will have an infrared Abbe number of approximately 33. A higher value of Abbe number signifies a lower relative dispersion, that is a lower change in index of refraction with changes in wavelength. In the thin lens approximation, the optical power defined as the reciprocal of the effective focal length (EFL) of the lens of a lens element is proportional to the product of the reduced index $(\eta/\eta'-1)$, where $\eta'$ is the index of refraction of the medium surrounding the lens, and the lens shape, C, given by the difference between front and back radii of curvature (ROC), that is $P=(\eta/\eta'-1)*C$, where $C=1/ROC,front-1/ROC,back$. From this formula, we see that the effect that the dispersion for a given lens element has on the overall lens assembly depends not only the glass properties but also on the shape of the lens. If attention is not paid to this effect, the result can be that the imaging condition will not be satisfied for all wavelengths within the design spectral band for a given set of object and image conjugate pairs. That is, the image quality will become substantially degraded as the wavelength is varied across the design band due to the images being defocused from the optimum image plane. Chromatic aberration can be minimized by engineering the materials, the shapes, the thicknesses, and spacing between lens elements. A minimum of two different materials, having different dispersion curves are necessary to reduce chromatic aberration but additional, that is three or more, material types may be necessary to adequately minimize chromatic aberrations.

Achromatic aberrations are defined as those aberrations which are present even in the absence of dispersion. The primary, or third order, aberrations have been categorized into five groups: spherical, coma, astigmatism, Petzval curvature and distortion. Each of these aberrations arise from the deviation of sin(theta)=theta at large angles and depend on the a combination of object plane position relative to the optical axis and how a ray launched from this position strikes the entrance pupil of the system. When the NA is high and the FOV is wide, theta increases leading to increased achromatic aberrations. These aberrations must be minimized and can be achieved by increasing the number of elements of the lens assembly and by engineering the individual element shapes, material, thickness, and spacing between lens elements. As the achromatic aberrations are reduced to a level such that the RMS spot size of the geometric image blur is substantially below the size of the Airy disk given by 1.22*lambda/NA, the objective assembly will be limited by fundamental diffraction effects and is referred to as diffraction-limited optical system.

A number of specific, non-exclusive prescriptions for the refractive objective lens assembly 10 are disclosed herein. In these embodiments, these refractive objective lens assemblies 12 have a combination of (i) a relatively high numerical aperture (NA ranging from 0.15-0.7), (ii) a relatively wide field of view ("FOV") (at least approximately 0.5 mm), and (iii) a magnification factor of between approximately four to twelve and one-half times (4×-12.5×). It should be obvious to those skilled in the art that increasing the magnification factor for any of the existing embodiments is straightforward. Additionally, the objective lens assemblies 12 disclosed herein are finite conjugate, and thus do not need a secondary lens to focus onto the object 14. Moreover, due to the unique design of these specific embodiments, it is straightforward to convert these objectives into infinite conjugate objectives by splitting the front and back groups into separate lens assemblies.

The type of object 14 being observed can vary. As non-exclusive examples, the object 14 can be a biological specimen such as a human or animal tissue sample, or plant matter, which is embedded in paraffin or exposed to air, which is stained or unstained, which is fixed to a variety of infrared transmissive substrates such as CaF2, BaF2, Si, Ge, ZnS, ZnSe, CdSe, or on reflective substrates such as Kevley, Au, Ag, Ti, Ni, Al, etc. Further, the object 14 could be a specimen, semiconductor material, organic polymer films, metallic films, insulating films, which can be amorphous, polycrystalline, or crsystalline. Furthermore, the object 14 can be a sample immersed in a liquid medium such as water or growth medium used to sustain microbial or cellular life. The object may also contain a hemispherical or hyperhemispherical solid substrate whose apex faces towards the front lens element, and which is made of an infrared transparent material such as CaF2, BaF2, ZnS, ZnSe, Si, or Ge so as to increase the effective numerical aperture of the objective lens assembly 10. As a non-exclusive example, if the object 14 is a tissue sample, the field of view of the objective lens assemblies 10 disclosed herein are sufficient to collect an image of a complete single tissue core within a tissue micro-array commonly used in tissue histopathology, while simultaneously achieving diffraction-limited spatial resolution in the entire or a large portion of the MIR spectral range. For example, the object 14 can be a tissue cores that is cut into 0.6 mm diameter cores. In one embodiment, the field of view of the objective lens assembly 10 is 0.65 mm so that the full extent of a single 0.6 mm diameter core 14 may be imaged at one time within a single FOV.

In one embodiment, a stage 25A retains the object 14, and a stage mover assembly 25B is used to move the stage 25A and the object 14 relative to the objective lens assembly 12. For example, the stage mover assembly 25B can be controlled to move the object 14 with 3 degrees of freedom (along the X, Y, Z) relative to the objective lens assembly 12. Alternatively, the stage mover assembly 25B can be designed to move the stage with six degrees of freedom. The stage mover assembly 25B can include one or more actuators or the stage 25A can be moved manually. For example, the stage mover assembly 25B can include a plurality of piezoelectric actuators that precisely position and move the object 14.

The type of light sensing device 24 can vary. For example, in one embodiment, the light sensing device 24 can be an MIR camera that includes a plurality of light sensing pixels that sense light in the MIR spectral range to capture a MIR image of the light 12 collected from the object 14. As a non-exclusive example, the light sensing device 24 can include a microbolometer focal plane array (FPA) or a mercury cadmium telluride (MCT) focal plane array having either any rectangular grid pattern having numbers of rows and columns in the vertical (V) and horizontal (H) directions ranging from 1 to 2000 pixels or 1 to 4,000,000 total pixels and any combination of V and H number of pixels within these ranges. Non-exclusive examples of specific configurations may include specifically 80×80, 160×160, 160×120, 160×128, 324×256, 320×240, 384×288, 640×512, 512×512, 640×640, 640×480, 480×480, 1024×1024, and 1024×768 with a pixel sizes ranging from 5 um up to 200 um, including configurations of approximately 5 um, 10 um, 17 um, 25 um, 34 um, and 50 um. However, other sizes are possible.

In alternative, non-exclusive examples, the light sensing device 24 has a measurement band (is able to sense light) that is approximately equal to (i) the entire MIR spectral range of approximately three to fifteen micrometers (3-15 μm); (ii) a predetermined desired range of approximately five and one-half to eleven micrometers (5.5-11 μm); (iii) a predetermined desired range of approximately six to ten micrometers (6-10 μm); (iv) a predetermined desired range of approximately eight to fourteen micrometers (8-14 μm); (v) a predetermined desired range of approximately seven to fourteen micrometers (7-14 μm); or (vi) a predetermined desired range of approximately three to eleven micrometers (3-11 μm).

Further, in certain embodiments, the light sensing device 24 can block and not sense light outside the respective measurement band. For the examples provided above, the light sensing device 24 can inhibit the sensing of light (i) greater than fifteen micrometers or less than three micrometers; (ii) greater than eleven micrometers or less than five and one-half micrometers; (iii) greater than ten micrometers or less than six micrometers; (iv) greater than eight or less than fourteen micrometers; (v) greater than seven or less than fourteen micrometers; or (vi) greater than three or less than eleven micrometers. It should be noted that the design of the light sensing device 24 can adjusted to match the desired requirements of the system.

The lens housing 18 is rigid and retains the plurality of lens elements 20. In one non-exclusive embodiment, the lens housing 18 is generally tubular shaped and retains the lens elements 20 on the inside of the lens housing 18. It should be noted that the lens housing 18 illustrated in FIG. 1A is greatly simplified and the lens housing 18 can include a plurality of housing components (not shown) for fixedly securing the lens elements 20 to the lens housing 18 with the proper spacing.

As provided above, the objective lens assembly 10 includes a plurality of lens elements 20 that are spaced apart along the optical axis 22. Further, each of the lens elements 20 are generally disk shaped and each lens element 20 is coaxial with the optical axis 22. As provided herein, the size, shape, design, spacing, and number of lens elements 20 can be varied to achieve the desired performance characteristics of the objective lens assembly 10. For example, in one embodiment, the objective lens assembly 10 includes (i) at least three spaced apart, refractive lens elements 20, (ii) at least two of the lens elements 20 are made of different materials, and (iii) each of the lens elements 20 is made of a material that operates in the MIR spectral range. For example, the lens materials can be selected from a group that includes germanium ("Ge"), zinc sulfide ("ZnS"), zinc selenide ("ZnSe"), silicon ("Si"), calcium fluoride ("CaF2"), Barium fluoride ("BaF2"), or sapphire.

As non-exclusive examples, achromatic aberrations of the objective lens assembly 10 can be minimized by (i) the use of multiple, as few as two, and as many as four types of materials (e.g. germanium, zinc sulfide, zinc selenide, silicon, CaF2); (ii) the combination of germanium, zinc sulfide, and zinc selenide; or (iii) the combination of germanium and silicon.

An important metric for describing the performance of the objective lens assemblies 10 provided herein is a ratio of the magnitude of the transverse magnification to the numerical aperture (|Mt|:NA) of the objective lens assembly 10. As provided herein, the size, shape, spacing and materials utilized for the lens elements 20 of the objective lens assemblies 10 are selected so that the assemblies 10 operate in the MIR spectral range, and the ratio (|Mt|:NA) is less than thirty. The lower the ratio, the better the performance of the lens assembly 10 provided that one achieves sufficient digital sampling as previously prescribed. As alternative, non-exclusive examples, as provided herein, the size, shape, spacing and materials utilized for the lens elements 20 of the objective lens assemblies 10 are selected so that the assemblies 10 operate in the MIR spectral range, and the ratio (|Mt|:NA) is less than 29, 28, 27, 26, 25, 24, 23, 22, 21, 20, 19, 18, 17, 16, 15, 14, 13, 12, or 11.

All specific, but non-exclusive objective assembly 10 designs prescribed herein or which can be derived as obvious extensions from these designs have a ratio of transverse magnification magnitude to NA of less than 30, the lower the value the better the metric. It is generally easier to achieve higher values of this ratio. For example, the specific but non-exclusive embodiment of the lens assembly 10 illustrated in FIG. 1A has an NA of 0.7, a magnification of 12.5×, and therefore a ratio of approximately 18. Another specific but non-exclusive embodiment of the lens assembly 210 (illustrated in FIG. 2A) has an NA of 0.35 and magnification of 4× to achieve a ratio of 11.4. Yet another specific but non-exclusive embodiment of the lens assembly 410 (illustrated in FIG. 4A) has a NA of 0.15 and a magnification of 4× to achieve a ratio of 26.7. Further, yet, another embodiment not illustrated herein, but which could be designed through obvious extension of the objective lens assembly 10 illustrated in FIG. 1A (having NA of 0.7 and a magnification of 12.5×) is an objective lens assembly achieving a NA of 0.9 and a magnification of 25 to produce a ratio of 28.

It should be noted with the teachings provided herein, numerous other lens assemblies designs are possible that achieve a ratio of below 30. The design prescriptions and general know how disclosed herein, therefore, represent significant advancement in the state-of-the-art performance of microscope objectives in the infrared range of the spectrum.

Still another important metric for describing the performance of the objective lens assemblies 10 provided herein is the amount of root mean square ("RMS") error that occurs over a specific wavelength (or wavenumber) range in the Mid-infrared spectrum. Generally, speaking, the lower the RMS error, the higher quality of the image formed at the image plane 16. For example, the objective lens assemblies provided herein are able to achieve a RMS wavefront error of less than approximately 0.5 waves over a wavenumber range of 900-1800 cm-1 band (5.5-11 micrometer range) in the mid-infrared spectral range. Stated in another fashion, the objective lens assemblies provided herein are able to achieve a RMS wavefront error of less than approximately 0.5 waves over a 5.5 micrometer wavelength range in the mid-infrared spectral range.

Further, in alternative, non-exclusive embodiments, the objective lens assemblies provided herein are able to achieve a RMS wavefront error of less than approximately 0.4, 0.3, 0.25, or 0.2 waves over a 5.5 micrometer wavelength range (e.g. the 900-1800 cm-1 band) in the mid-infrared spectral range. Moreover, the present lens assemblies are able to achieve these low RMS wavefront errors In alternative, non-exclusive embodiments, the lens assemblies provided herein are able to achieve a RMS wavefront error of less than 0.5, 0.4, 0.3, 0.25, or 0.2 waves over a 5.5 micrometer wavelength range (e.g. the 5.5 to 11 micrometer range) in the mid-infrared spectral range, and over a field of view of between 100 micrometers up to 2.0 millimeters. As alternative examples, the results provided herein are possible with a field of view of at least 0.5, 0.6, 0.7, 0.8, 0.9, 1, 1.1, 1.2, 1.3, 1.4, 1.5, 1.6, 1.7, 1.8, 1.9, 2 millimeters.

A number of different, non-exclusive examples of objective lens assemblies 10 are provided herein. In the first embodiment illustrated in FIG. 1A, the objective lens assembly 10 is refractive objective lens assembly having (i) a numerical aperture of approximately 0.7, a magnification of 12.5×, a field of view of greater than 2 degrees full-angle (or greater than 0.6 millimeters when using a light sensing device 24 having 480×480 pixel Focal Point Array ("FPA") with 17 um pixel size), and a diffraction limited performance over a wavelength range of 900-1800 cm$^{-1}$ (a spectral bandwidth of 900 cm$^{-1}$). This objective lens assembly 10 is achromatic over the spectral range of five and one-half to eleven micrometers (5.5-11 µm).

In the embodiment illustrated in FIG. 1A, the objective lens assembly 10 includes five spaced apart optical lens elements 20 which can be grouped into two groups, namely (i) a front lens group 20A (can also be referred to as the first lens group) that contains the first three elements 20; and (ii) a back lens group 20B (can also be referred to as the second lens group) that contains the final two elements 20B. In this example, the front lens group 20A is closer than the back lens group 20B to the object plane 15, while the front lens group 20A is farther than the back lens group 20B to the image plane 16.

For convenience, moving left to right in FIG. 1A (objectwise to imagewise), the lens elements 20 of (i) the first lens group 20A can be labeled as a front, first lens element 26 that is closest to the object 14 being observed; a front, second element 28 spaced apart and directly to the right of the front, first lens element 26; and a front, third lens element 30 spaced apart and directly to the right of the front, second lens element 28; and (ii) the second lens group 20B can be labeled as a back, first lens element 32 spaced apart and directly to the right of the front, third lens element 30; and a back, second lens element 34 spaced apart and directly to the right of the back, first lens element 32. In this embodiment, the back second lens element 34 is the closest to the image plane 16, and the lens elements 28, 30, 32 are spaced apart and are positioned between the front first lens element 26 and the back second lens element 34.

It should be noted that (i) the front, first lens element 26 can also be referred to as a front lens element, (ii) the back, second lens element 34 can also be referred to as a rear lens element, and (iii) the lens elements 28, 30 and 32 can also be referred to as intermediate lens elements 28, 30, 32.

In certain embodiments, the front lens group 20A and back lens group 20B are independently corrected for infinite image conjugates, and/or the back lens group 20B is designed to achieve anomalous dispersion such that the effective focal length of the back lens group 20B decreases with increasing wavelength. Thus, the present invention provides a straightforward way to convert these objectives into infinite conjugate objectives by splitting the front lens group 20A from the back lens group 20B. This feature allows for the increase in separation distance between front and back lens groups without increasing aberrations. This enables beam splitters (not shown) or other optical filtering components (not shown) to be easily placed between the front and back lens groups 20A, 20B that are designed to operate with collimated light.

Figure 1B:
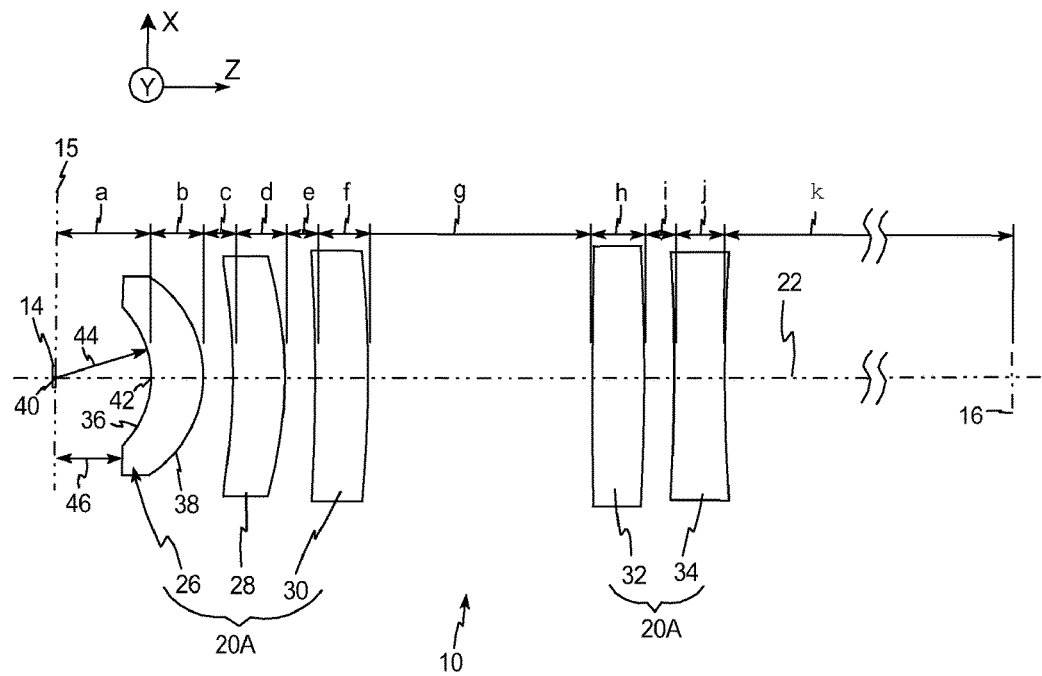
FIG. 1B is a larger, simplified side view, of a portion of the objective lens assembly, the object and image plane of FIG. 1A.

FIG. 1B is a larger, simplified side view of a portion of the objective lens assembly 10 from FIG. 1A including (i) the lens elements 26, 28, 30, of the front lens group 20A; (ii) the lens elements 32, 34 of the back lens group 20B, (iii) the object 14 at the object plane 15, and (iv) the image plane 16. Each of the lens elements 20 includes a forward surface 36 and a rearward surface 38. Further, for each element 20, the forward surface 36 faces the object 14 (faces left away from the image plane 16) and is closer to the object 14 than its corresponding rearward surface 38, while the rearward surface 38 faces the image plane 16 (faces right away from the object 14) and is closer to the image plane 16 than its corresponding forward surface 36.

In FIG. 1B, (i) the distance "a" illustrates a front separation distance between the object 14 and the forward surface 36 of the front, first lens element 26 along the optical axis 22; (ii) the distance "b" illustrates a thickness of the front first lens element 26 along the optical axis 22; (iii) the distance "c" illustrates a separation distance between the rearward surface 38 of the front, first lens element 26 and the forward surface 36 of the front second lens element 28 along the optical axis 22; (iv) the distance "d" illustrates a thickness of the front second lens element 28 along the optical axis 22; (v) the distance "e" illustrates a separation distance between the rearward surface 38 of the front, second element 28 and the forward surface 36 of the front, third lens element 30 along the optical axis 22; (vi) the distance "f" illustrates a thickness of the front, third lens element 30 along the optical axis 22; (vii) the distance "g" illustrates a separation distance between the rearward surface 38 of the front, third lens element 30 and the forward surface 36 of the back, first lens element 32 along the optical axis 22; (viii) the distance "h" illustrates a thickness of the back, first lens element 32 along the optical axis 22; (ix) the distance "i" illustrates a separation distance between the rearward surface 38 of the back first lens element 32 and forward surface 36 of the back second lens element 34 along the optical axis 22; (x) the distance "j" illustrates a thickness of the back second lens element 34 along the optical axis 22; and (xi) the distance "k" illustrates the distance between the rearward surface 38 of the back second lens element 34 and the image plane 16 along the optical axis 22.

In certain embodiments, the separation distance "c", "e", "g", "i" between adjacent lens elements 20 is greater than 0.5 millimeters and less than five micrometers in order to shift parasitic etalons out of the spectral band of spectroscopic systems containing the objective lens assembly 10.

It should be noted that each thickness "b", "d", "f", "h", "j" can be referred to as the center thickness Lc. Further, the center thickness, Lc, of each lens elements 20 of the objective lens assembly 10 adheres to the formula: Lc>1/(4*η), where η is the average index of refraction over the mid-infrared operating band of the lens assembly, in order to shift parasitic etalons out of the spectral band of spectroscopic systems containing the objective lens assembly 10.

In the embodiment illustrated in FIG. 1B, each of the surfaces 36, 38 of each of the elements 20 is curved and has a center of curvature 40 (illustrated with a circle) located on the optical axis 22, with a vertex 42 of the respective surface 36, 38 being located on the optical axis 22. As provided herein, for each surface 36, 38, a radius of curvature 44 is equal to a distance from its vertex 42 to its center of curvature 40. As provided herein, for each surface 36, 38, (i) if its vertex 42 is left of its center of curvature 40, the radius of curvature 40 is positive; and (ii) if its vertex 42 is right of its center of curvature 40, the radius of curvature 44 is negative. It should be noted that only the center of curvature 40, vertex 42, and radius of curvature 44 of the forward surface 36 of the front, first lens element 26 is labeled in FIG. 1B. In the case that the first lens surface contains aspherical or hyperboloidal surfaces that deviate from a pure spherical shape, the radius of a sphere that shall best describe the aspherical surface, for example using a least-squares fit, shall be used.

As provided herein, in certain embodiments, the front, first lens element 26 is uniquely designed and positioned so that (i) the forward surface 36 has a radius of curvature 44 that is negative; and (ii) the center of curvature 40 of the forward surface 36 is positioned on the optical axis 22, and is approximately at the object plane 15. Stated in another fashion, the front, first lens element 26 is uniquely designed and positioned so that the front separation distance "a" along the optical axis 22 is approximately equal to the radius of curvature 44 of the forward surface 36 of the front first lens element 26. In alternative, non-exclusive embodiments, the front separation distance "a" is within approximately 1, 0.9, 0.8, 0.7, 0.6, 0.5, 0.4, 0.3, 0.2, or 0.1 percent of the radius of curvature 44. A benefit of this design is that the first surface introduces no aberrations for on axis object points and negligible aberrations for off-axis points due to the lack of ray bending at the surface.

Moreover, the rearward surface 39 of the front first lens element 28 can be designed to approximately satisfy the aplanatic condition as defined by the expression: $R=-(\eta/(\eta+\eta'))*L$, where η is the index of refraction of the first lens element, η' is the index of refraction of the medium surrounding the lens element, and L is the physical distance from the vertex of the rearward surface and the on-axis object point which is the sum of the distance from the on-axis object point and the vertex of the forward surface of the first element and the center thickness of the first lens element.

Further, in certain embodiments, the lens elements 20 are uniquely designed and positioned so that a working distance 46 of the optical lens assembly 10 is less than approximately one hundred millimeters, 75 mm, or 50 mm. As provided herein, the term working distance 46 shall be equal to the shortest distance between the front first lens element 26 and the object plane 15. A benefit of this design is that object distances are located within a suitable range for microscopy applications that require magnification factors greater than 2×.

Additionally, in one embodiment, (i) the back first lens element 30 has a positive optical power of lower dispersion, and (ii) the back second lens element 34 has a negative optical power of higher dispersion. This feature allows the back lens group 20B to achieve the effect of creating an air spaced doublet having positive power with anomalous dispersion, that is the effective focal length of the doublet decreases with increasing wavelength.

As provided herein, depending upon the design, at least two of the lens elements 20 are made of different materials that operate in the MIR spectral range. In one embodiment, the front, first lens element 26 is made of a material having an index of refraction that is greater than two for the mid-infrared spectral range. For example, a suitable material for the front, first lens element 26 is selected from a group that includes germanium, zinc sulfide, zinc selenide, and silicon.

In one embodiment, the front, first lens element 26 is made of a material having an infrared Abbe number that is greater than an Abbe number for a material of one of the other lens elements 28, 30, 32, 32. Further, the back, first lens element 32 is made of a first material and the back, second lens element 34 is made of a second material; and wherein the first material has an infrared Abbe number is greater than an Abbe number for the second material in the mid-infrared spectral range.

Table 1 below is one, non-exclusive lens prescription for the objective lens assembly 10 of FIGS. 1A and 1B:

TABLE 1

| Group | Element | Surface | Radius | Thickness | Material | Semi-diameter | Conic |
|---|---|---|---|---|---|---|---|
| — | — | object | — | 9.5 | air | — | — |
| 1 | 1 | F | −9.5 | 5.0 | germanium | 6.8 | 0 |
| | | B | −11.6 | 3.0 | air | 9.8 | 0 |
| | 2 | F | −65.9 | 5.0 | zinc selenide | 10.9 | 0 |
| | | B | −42.8 | 3.0 | air | 11.7 | 0 |
| | 3 | F | −170.5 | 5.0 | zinc selenide | 11.9 | 0 |
| | | B | −138.3 | 22.0 | air | 12.2 | 0 |
| 2 | 1 | F | 458.8 | 5.0 | germanium | 12.7 | 0 |
| | | B | −294.6 | 3.0 | air | 12.6 | 0 |
| | 2 | F | −196.1 | 5.0 | zinc selenide | 12.0 | 0 |
| | | B | 189.1 | 195.0 | air | 11.7 | 0 |
| — | — | image | — | 0.0 | — | — | — |

Referring to Table 1, in this example, for the first lens group 20A, (i) the front, first lens element 26 is aplanatic and is made of germanium, (ii) the front, second element 28 is made of ZnSe, and (iii) the front, third lens element 30 is made of ZnSe. Further, for the second lens group 20B, (i) the back, first lens element 32 is made of germanium, and (ii) the back, second lens element 34 is made of ZnS. In this embodiment, the aberrations are minimized to achieve high-resolution (high-NA), wide-field-of-view (FOV) performance through the use of (i) an aplanatic front first lens element 26 and an aplanatic back, first lens element 32; (ii) the use of a high-index material (e.g. germanium) for the front first lens element 26 and back first lens element 32; and (iii) the use of refractive lens elements 20.

Figure 1C:
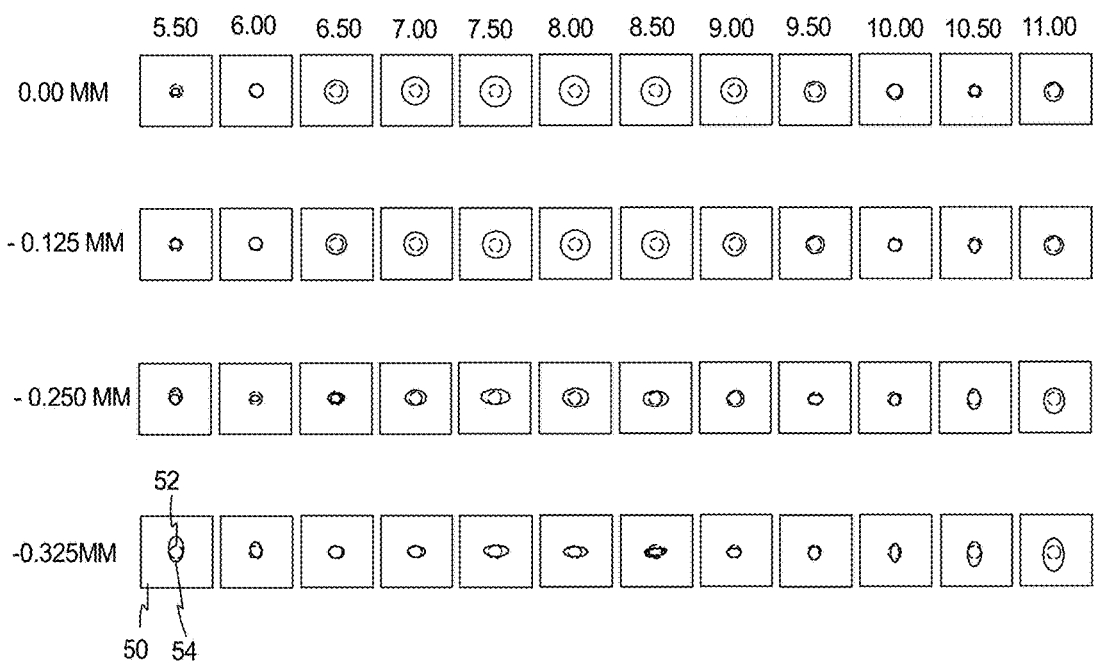
FIG. 1C includes a plurality of spot diagrams generated for the objective lens assembly of FIGS. 1A and 1B.

FIG. 1C includes a plurality of spot diagrams 50 generated for the objective lens assembly 10 of FIGS. 1A and 1B. FIG. 1C illustrates simulated data that was generated using an optical and illumination design software. These spot diagrams 50 can be used to analyze the performance of the objective lens assembly 10. In this example, each spot diagram 50 is a two dimensional plot where the vertical axis is the field position in millimeters (radial distance from the center of the field of view (e.g. the optical axis) of the objective lens assembly 10), and the horizontal axis is the wavelength. Each spot diagram 50 includes an airy disk 52 (illustrated with a dashed line), and the actual spot 54 (illustrated with a circle or oval) that would be captured on the light sensing device (illustrated in FIG. 1A).

More specifically, (i) the upper row of spot diagrams 50 have a field position of zero millimeters (not offset from the optical axis), and wavelength of each subsequent spot diagram 50 changes from 5.5 to 11 microns, in half micron spacings; (ii) the second highest row of spot diagrams 50 have a field position of −0.125 millimeters (radially offset by 0.125 millimeters from the optical axis), and wavelength of each subsequent spot diagram 50 changes from 5.5 to 11 microns, in half micron spacings; (iii) the third highest row of spot diagrams 50 have a field position of −0.250 millimeters (radially offset by 0.250 millimeters from the optical axis), and wavelength of each subsequent spot diagram 50 changes from 5.5 to 11 microns, in half micron spacings; and (iv) the lowest row of spot diagrams 50 have a field position of −0.325 millimeters (radially offset by 0.325 millimeters from the optical axis), and wavelength of each subsequent spot diagram 50 changes from 5.5 to 11 microns, in half micron spacings.

These spot diagrams 50 illustrate that the objective lens assembly 10 described above and illustrated in FIGS. 1A and 1B maintains very good performance as the field position changes towards the edge of the field of view. This will result in a higher resolution image captured with the light sensing device 24 (illustrated in FIG. 1A).

Figure 1D:
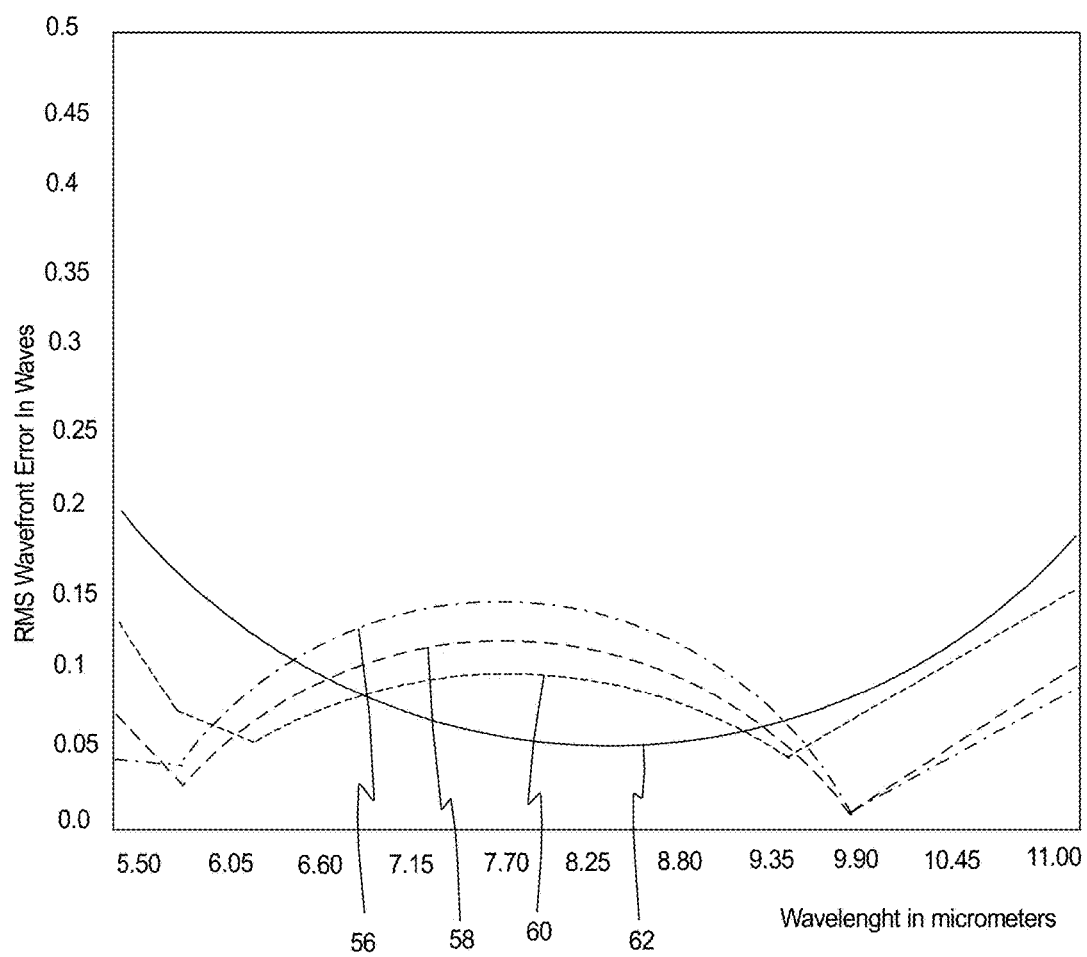
FIG. 1D illustrates RMS wavefront error in units of waves versus wavelength in micrometers for the objective lens assembly of FIGS. 1A and 1B.

FIG. 1D is a graph is another way to illustrate the performance of the objective lens assembly 10 described above and illustrated in FIGS. 1A and 1B. FIG. 1D illustrates simulated data that was generated using an optical and illumination design software. More specifically, FIG. 1D illustrates RMS wavefront error in units of waves (vertical axis) versus wavelength in micrometers (horizontal axis) for the objective lens assembly 10 described above and illustrated in FIGS. 1A and 1B. The graph includes a separate curve for four different field positions, namely (i) curve 56 for on-axis field position; (ii) curve 58 for a field position of −0.125 millimeters (radial axis offset of −0.125 millimeters); (iii) curve 60 for a field position of −0.250 millimeters (radial axis offset of −0.250 millimeters); and (iv) curve 62 for a field position of −0.325 millimeters (radial axis offset of −0.325 millimeters). Performance is better when the RMS wavefront error is small. As illustrated in FIG. 1D, the RMS wavefront error of the objective lens assembly 10 will vary according to field position and wavelength. Importantly, the objective lens assembly 10 was designed to minimize the RMS wavefront error as best as possible across the desired band.

As illustrated in FIG. 1D, (i) the RMS wavefront error is less than 0.2 waves for the entire 5.5 to 11 micrometer range, and (ii) for the on-axis field position, the RMS wavefront error is less than 0.15 waves for the entire 5.5 to 11 micrometer range. Additionally, it should be noted that each curve 56, 58, 60, 62 has a minimum RMS wavefront error at a specific wavelength in the 5.5 to 11 micrometer range. For example, the minimum RMS wavefront error for curve 56 (on-axis) is at approximately 9.9 micrometers.

Referring back to FIG. 1B, as provided herein, changing the front separation distance "a" between the object 14 and the forward surface 36 of the front, first lens element 26 will change the wavelength where the RMS wavefront error is at a minimum. Thus, at certain wavelengths in the Mid-infrared spectral range, the RMS wavefront error can be reduced and optimized by adjusting the separation distance "a".

Figure 1E:
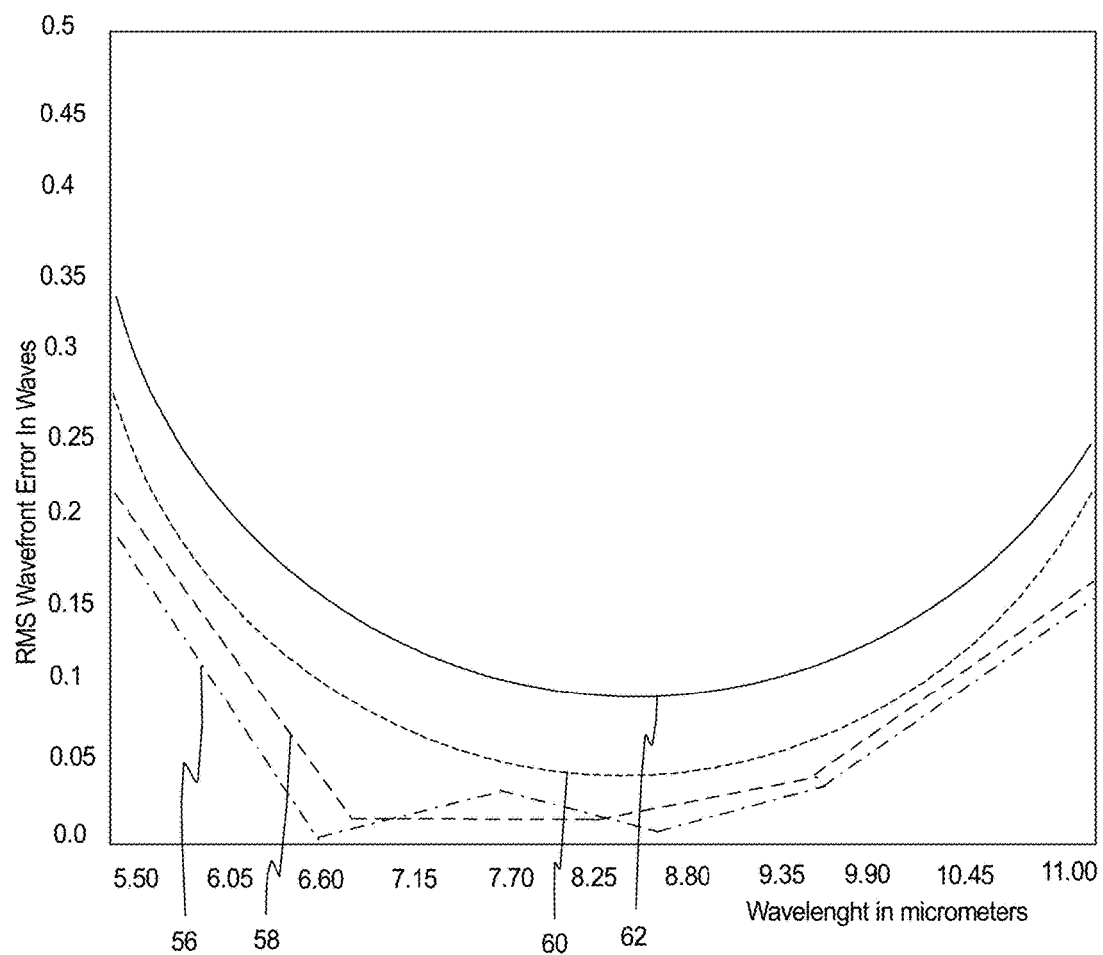
FIG. 1E illustrates RMS wavefront error in units of waves versus wavelength in micrometers for the objective lens assembly of FIGS. 1A and 1B with an increased front separation distance.

FIG. 1E illustrates RMS wavefront error in units of waves (vertical axis) versus wavelength in micrometers (horizontal axis) for the objective lens assembly 10 described above and illustrated in FIGS. 1A and 1B with the front separation distance "a" increased by ten micrometers. FIG. 1E illustrates simulated data that was generated using an optical and illumination design software. The graph includes a separate curve for four different field positions, namely (i) curve 56 for on-axis field position; (ii) curve 58 for a field position of −0.125 millimeters (radial axis offset of −0.125 millimeters); (iii) curve 60 for a field position of −0.250 millimeters (radial axis offset of −0.250 millimeters); and (iv) curve 62 for a field position of −0.325 millimeters (radial axis offset of −0.325 millimeters).

As illustrated in FIG. 1E, with a ten micrometer displacement of the object from its nominal position, the minimum RMS wavefront error for curve 56 (on-axis) is now moved to approximately 6.6 micrometers. Thus, the separation distance "a" can be adjusted to adjust the performance of the lens assembly 10 and increase the achromatic range of the lens assembly from 5.5-11 um to 3-11 um.

Figure 1F:
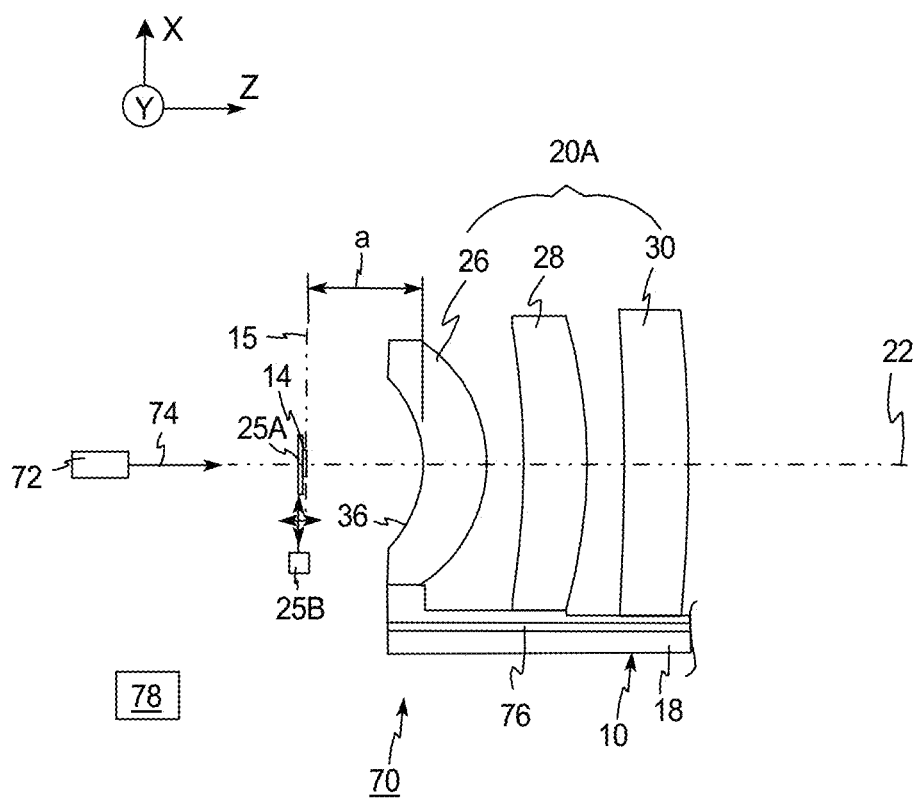
FIG. 1F is a simplified illustration of an assembly that includes a lens assembly having features of the present invention.

FIG. 1F is a simplified illustration of an assembly 70 that includes a lens assembly 10 (only a portion is illustrated in FIG. 1F) that is similar to the lens assembly 10 illustrated in FIGS. 1A and 1B. In this embodiment, the assembly 70 includes a Mid-infrared laser source 72 that directs a coherent mid-infrared beam 74 at the object 14 along the optical axis 22. For example, the laser source 72 can be tunable to generate different wavelength beams 74 in the mid-infrared spectrum. In FIG. 1F, the beam 74 is transmitted through the object 14. Alternatively, the assembly 70 can be designed so that the beam 74 is directed through the lens assembly 10 and reflected off of the object 14.

Further, in this embodiment, the assembly 70 includes the stage 25A that retains the object 14, and the stage mover assembly 25B that moves the object 14 relative to the lens assembly 10 and the object plane 15. Additionally, in this embodiment, the lens assembly 10 includes a lens mover assembly 76 (e.g. one or more actuators) that can be used to move the lens elements 26, 28, 30 of the front lens group 20A relative to the lens housing 18, the object 14, the object plane 15, and the back lens group 20B (illustrated in FIG. 1B). Alternatively, the lens mover assembly 76 can be used to move just front first lens elements 26.

With this design, either or both of the mover assemblies 25B, 76 can be used to selectively adjust the front separation distance "a" to selectively adjust the characteristics of the lens assembly 10. Additionally, in this embodiment, the assembly 70 includes a control system 78 that can be used to selectively control one or both of the mover assemblies 25B, 76 to selectively adjust the characteristics of the lens assembly 10. The control system 78 can include one or more processors.

For example, if the laser source 72 is tunable, the control system 78, in a feedforward fashion, can control one or both of the mover assemblies 25B, 76 to selectively adjust the separation distance "a" so that the lens assembly 10 has the optimum characteristics (reduce RMS wavefront error) at the wavelength of the beam 74. Stated in another fashion, in certain embodiments, the present invention adjusts the separation distance "a" in a feed forward fashion to achieve the best performance from the objective lens assembly 10. For example, if it is desired to capture an image of the object 14 when the laser beam 74 has a center wavelength of ten micrometers, the separation distance "a" is adjusted to achieve the best performance from the objective lens assembly 10 at ten micrometers. Alternatively, if it is desired to capture an image of the object 14 when the laser beam 74 has a center wavelength of eight micrometers, the separation distance "a" is adjusted to achieve the best performance from the objective lens assembly 10 at eight micrometers.

In one embodiment, actual or simulated tests can be performed to determine the best, front separation distance "a" for each wavelength in the mid-infrared spectrum or portion thereof to generate a lookup table. Subsequently, the control system 78 can use the lookup table to control the front separation distance "a" to achieve the reduced RMS wavefront error based on the wavelength of the beam 74.

The maximum amount of change in separation distance "a" required to achieve optimum results across the entire desired wavelength range will vary according to the design of the objective lens assembly 10. For example, in alternative non-exclusive embodiments, the separation distance "a" can be varied by a 5, 10, 15, or 20 micrometer range to achieve the desired optimization.

Figure 2A:
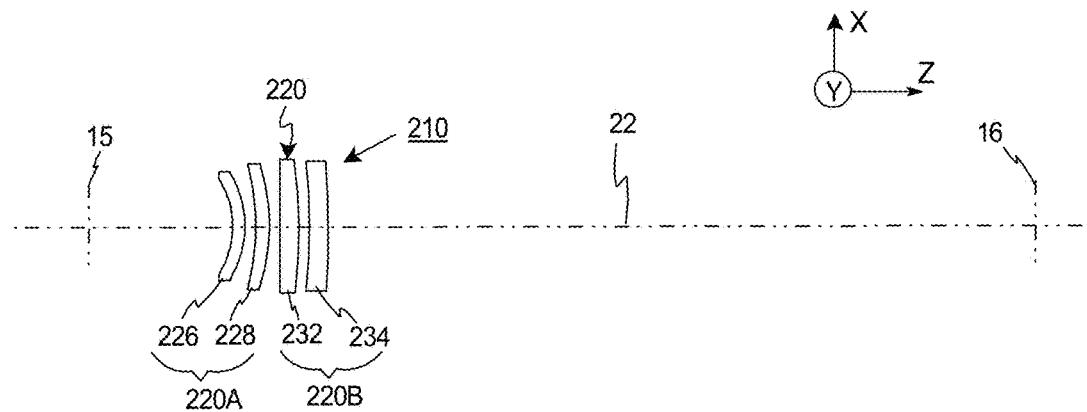
FIG. 2A is a simplified side view, of another embodiment of an objective lens assembly having features of the present invention.

Another, non-exclusive example of an objective lens assembly 210 is illustrated in FIG. 2A, the object plane 15 and the image plane 16. In this embodiment, the objective lens assembly 210 is somewhat similar to the lens assembly 10 described above. However, in this embodiment, the objective lens assembly 210 has a numerical aperture of 0.35, a magnification of 4×, a field of view of greater than 7 degrees full-angle (or greater than 2 millimeters when using a 480×480 pixel FPA with 17 um pixel size), and a diffraction limited performance over the spectral range of 900-2000 cm$^{-1}$ (a spectral bandwidth of 1100 cm$^{-1}$); and chromatic aberration control over the spectral range of five and one-half to eleven micrometers (5.5-11 μm).

In the embodiment illustrated in FIG. 2A, the objective lens assembly 210 includes four spaced apart optical lens elements 220 which can be grouped into two groups, namely (i) a front lens group 220A that contains the first two elements 220; and (ii) a back lens group 220B that contains the final two elements 220B. The front lens group 220A is closer than the back lens group 220B to the object plane 15, while the front lens group 220A is farther than the back lens group 220B to the image plane 16.

For convenience, moving left to right in FIG. 2A (objectwise to imagewise), the lens elements 220 of (i) the first lens group 220A can be labeled as a front, first lens element 226 that is closest to the object 214 being observed; and a front, second element 228 spaced apart and directly to the right of the front, first lens element 226; and (ii) the second lens group 220B can be labeled as a back, first lens element 232 spaced apart and directly to the right of the front, second lens element 228; and a back, second lens element 234 spaced apart and directly to the right of the back, first lens element 232.

In this embodiment, the front lens group 220A is corrected for infinite image conjugate, and/or the back lens group 220B is designed to achieve anomalous dispersion such that the effective focal length of the back lens group 220B decreases with increasing wavelength.

Figure 2B:
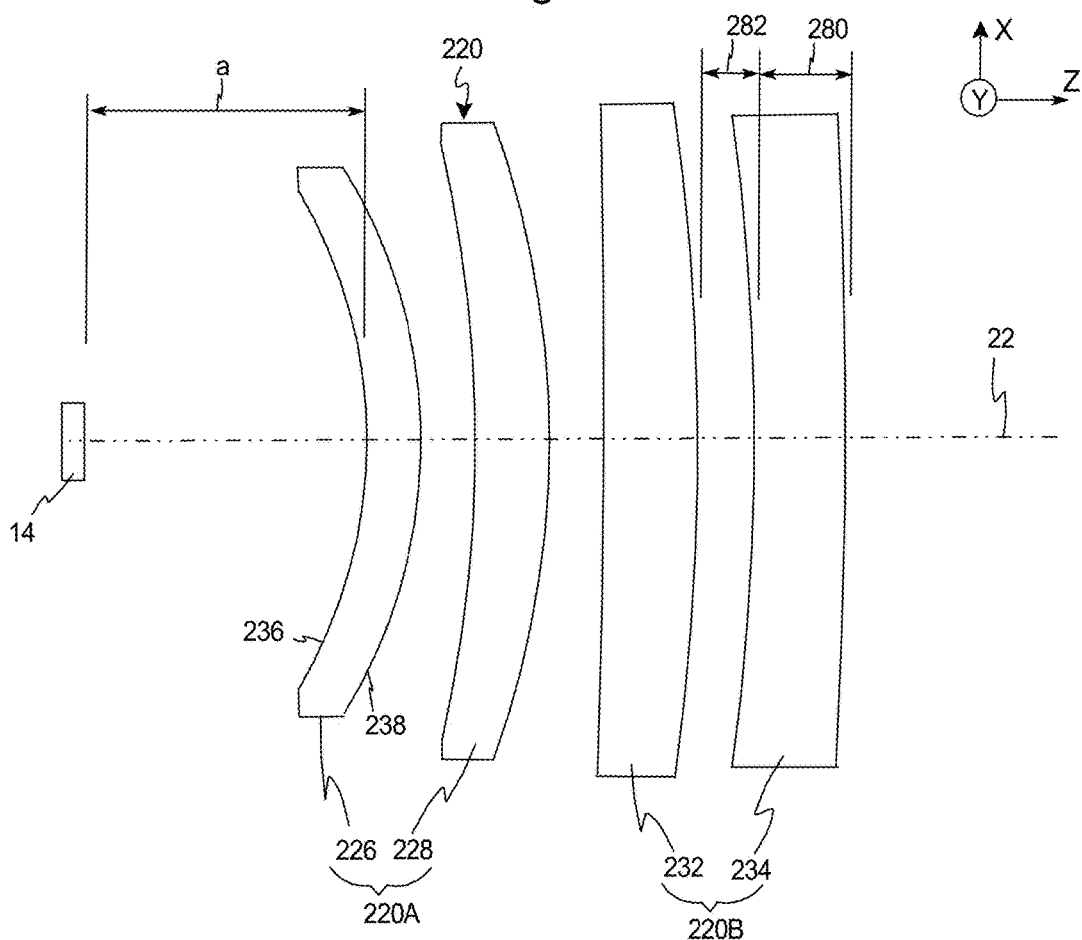
FIG. 2B is a larger, simplified side view, of a portion of the objective lens assembly of FIG. 2A.

FIG. 2B is a larger, simplified side view of a portion of the objective lens assembly 210 from FIG. 2A including (i) the lens elements 226, 228 of the front lens group 220A; (ii) the lens elements 232, 234 of the back lens group 220B, and (iii) the object 214. Each of the lens elements 220 includes a forward surface 236 and a rearward surface 238. Further, each lens 220 has a lens thickness 280 (only one is shown) and a separation distance 282 (only one is shown) separates adjacent lens elements 220. Further, the forward surface 236 of the front first lens element 226 is spaced apart a front separation distance "a" along the optical axis 22.

Table 2 below is one, non-exclusive lens prescription for the objective lens assembly 210 of FIGS. 2A and 2B:

TABLE 2

| Group | Element | Surface | Radius | Thickness | Material | Semi-diameter | Conic |
|---|---|---|---|---|---|---|---|
| — | — | object | — | 40 | air | — | — |
| 1 | 1 | F | −26.4 | 3.0 | germanium | 13.6 | 0 |
|   |   | B | −27.7 | 3.0 | air | 14.9 | 0 |
|   | 2 | F | −72.8 | 4.0 | zinc selenide | 16.5 | 0 |
|   |   | B | −51.1 | 3.0 | air | 17.3 | 0 |
|   | 3 | F | −526.0 | 4.0 | germanium | 18.0 | 0 |
|   |   | B | −138.3 | 3.0 | air | 18.3 | 0 |
|   | 4 | F | −140.6 | 5.0 | zinc sulfide | 17.8 | 0 |
|   |   | B | −387.8 | 195.0 | air | 17.7 | 0 |
| — | — | image | — | 0.0 | — | — | — |

Referring to Table 2, in this example, for the front lens group 220A, (i) the front, first lens element 226 is aplanatic and is made of germanium, and (ii) the front, second element 228 is made of ZnSe. Further, for the back lens group 220B, (i) the back, first lens element 232 is made of germanium, and (ii) the back, second lens element 234 is made of ZnS. In this embodiment, the aberrations are minimized to achieve high-resolution (high-NA), wide-field-of-view (FOV) performance through the use of (i) an aplanatic front first lens element 226 and an aplanatic back, first lens element 232; (ii) the use of a high-index material (e.g. germanium) for the front first lens element 226 and back first lens element 232; and (iii) the use of refractive lens elements 220.

Figure 2C:
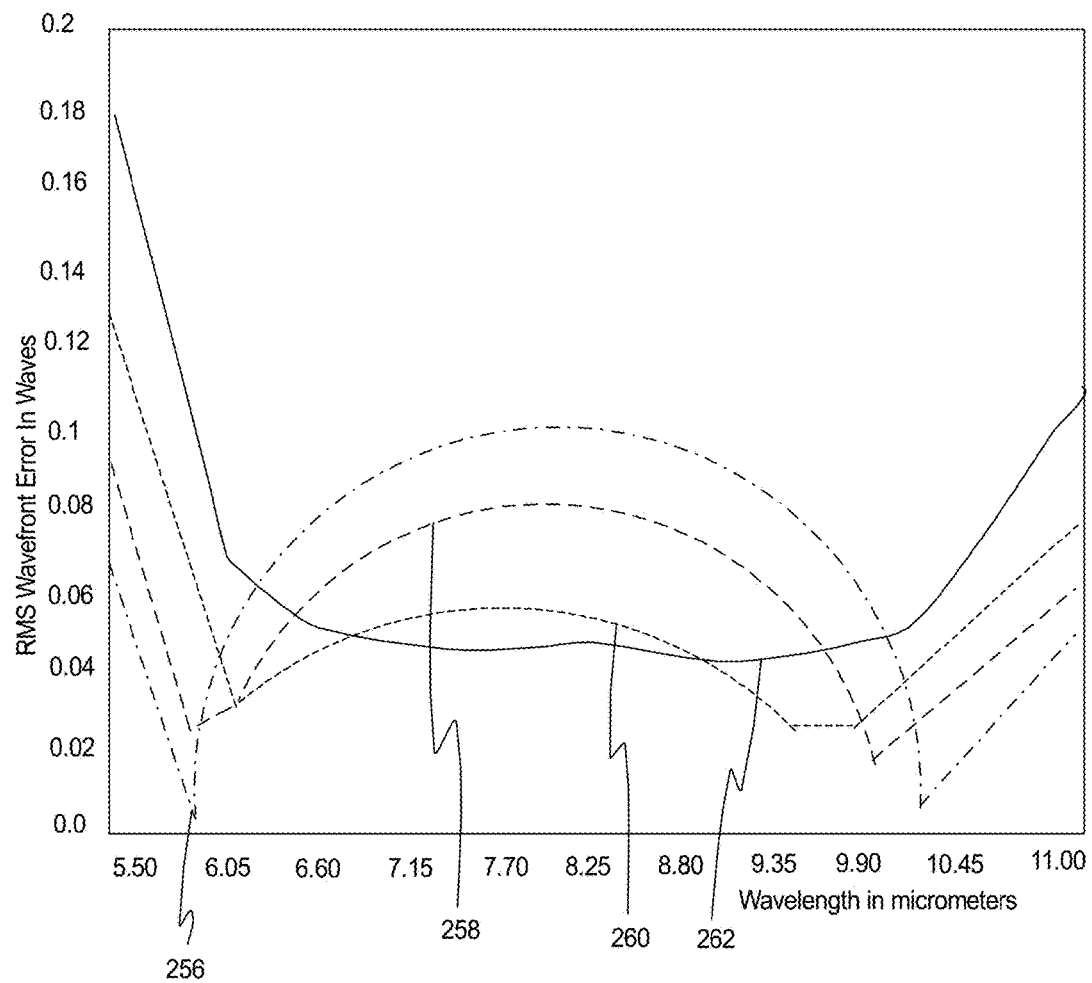
FIG. 2C illustrates RMS wavefront error in units of waves versus wavelength in micrometers for the objective lens assembly of FIGS. 2A and 2B.

FIG. 2C is a graph that illustrates the performance of the objective lens assembly 210 described above and illustrated in FIGS. 2A and 2B. FIG. 2C illustrates simulated data that was generated using an optical and illumination design software. More specifically, FIG. 2C illustrates RMS wavefront error in units of waves (vertical axis) versus wavelength in micrometers (horizontal axis) for the objective lens assembly 210 described above and illustrated in FIGS. 2A and 2B. The graph includes a separate curve for four different field positions, namely (i) curve 256 for on-axis field position; (ii) curve 258 for a field position of −0.5 millimeters (radial axis offset of −0.5 millimeters); (iii) curve 260 for a field position of −0.750 millimeters (radial axis offset of −0.750 millimeters); and (iv) curve 262 for a field position of −1.000 millimeters (radial axis offset of −1.000 millimeters). As illustrated in FIG. 2C, the RMS wavefront error of the objective lens assembly 10 will vary according to field position and wavelength. Importantly, the objective lens assembly 210 was designed to minimize the RMS wavefront error as best as possible across the desired band.

As illustrated in FIG. 2C, the RMS wavefront error is less than 0.18 waves for the entire 5.5 to 11 micrometer range. Additionally, it should be noted that each curve 256, 258, 260, 262 has a minimum RMS wavefront error at a specific wavelength in the 5.5 to 11 micrometer range. Thus, as provided above, the RMS wavelength error can again be adjusted by adjusting the front separation distance "a".

Figure 3A:
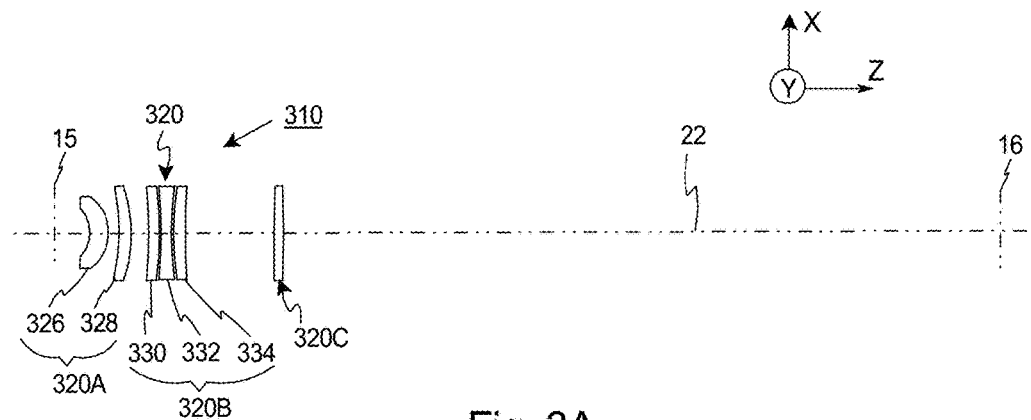
FIG. 3A is a simplified side view, of another embodiment of an objective lens assembly having features of the present invention.

Another, non-exclusive example of an objective lens assembly 310 is illustrated in FIG. 3A, with the object plane 15 and the image plane 16. In this embodiment, the objective lens assembly 310 is somewhat similar to the lens assembly 10 described above. However, in this embodiment, the objective lens assembly 310 has a numerical aperture of 0.7, and a magnification of 12.5.

In the embodiment illustrated in FIG. 3A, the objective lens assembly 310 includes six spaced apart optical lens elements 320 which can be grouped into three groups, namely (i) a front lens group 320A that contains the first two elements 320; (ii) an intermediate lens group 320B that contains the three elements 320; and (iii) a rear lens group 320C that includes a single lens element 320. The front lens group 320A is closer than the back lens group 320C to the object plane 15, while the front lens group 320A is farther than the back lens group 320B to the image plane 16.

For convenience, moving left to right in FIG. 3A (object-wise to imagewise), the lens elements 320 of (i) the front lens group 320A can be labeled as a front, first lens element 326, and a front, second element 328; (ii) the intermediate lens group 320B can be labeled as an intermediate, first lens element 330, an intermediate, second lens element 332, and an intermediate third lens element 334; and (iii) the single lens element 320 of the rear lens group 320C.

Figure 3B:
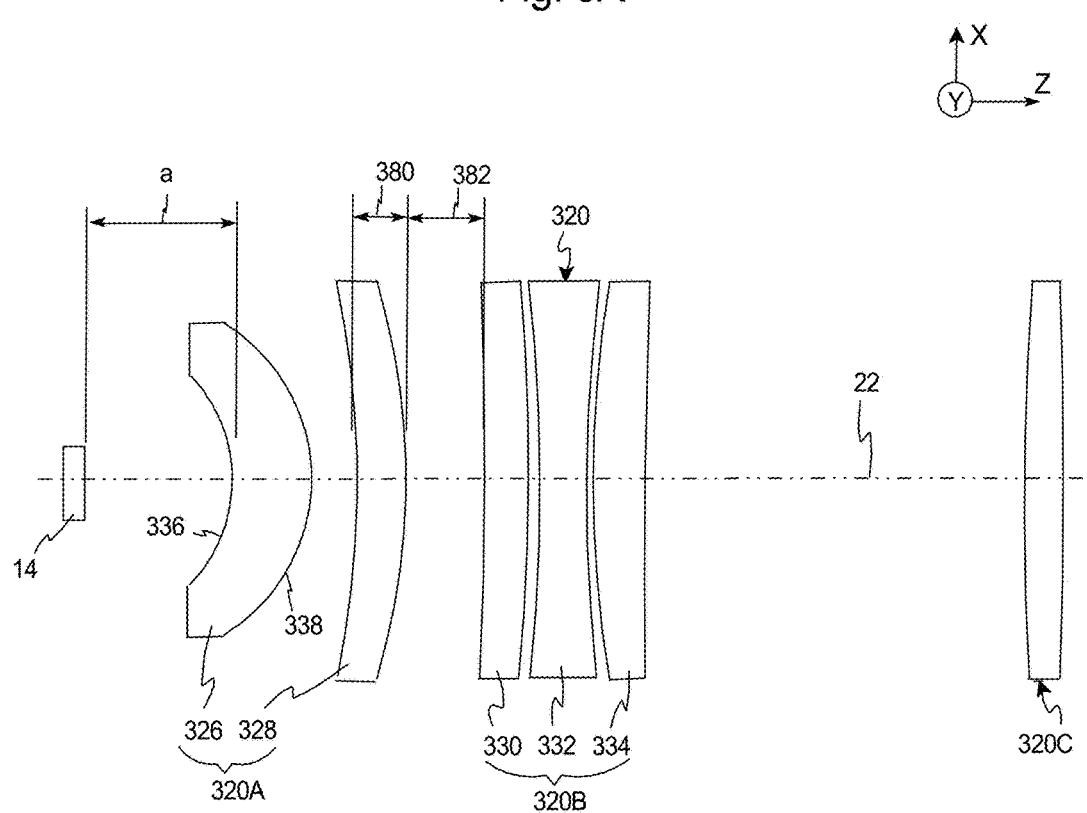
FIG. 3B is a larger, simplified side view, of a portion of the objective lens assembly of FIG. 3A.

FIG. 3B is a larger, simplified side view of a portion of the objective lens assembly 310 from FIG. 3A including (i) the lens elements 326, 328 of the front lens group 320A; (ii) the lens elements 332, 334, 336 of the intermediate lens group 320B, (iii) the one lens elements 320 of the rear lens group 320C, and (iv) the object 14. Each of the lens elements 320 includes a forward surface 336 and a rearward surface 338. Further, each lens 320 has a lens thickness 380 (only one is shown) and a separation distance 382 (only one is shown) separates adjacent lens elements 320. Further, the forward surface 336 of the front first lens element 326 is spaced apart a front separation distance "a" along the optical axis 22 from the object 14.

Table 3 below is one, non-exclusive lens prescription for the objective lens assembly 310 of FIGS. 3A and 3B:

TABLE 3

| Group | Element | Surface | Radius | Thickness | Material | Semi-diameter | Conic |
|---|---|---|---|---|---|---|---|
| — | — | object | — | 9.5 | air | — | — |
| 1 | 1 | F | −9.5 | 5.0 | germanium | 6.7 | 0 |
|  |  | B | −11.6 | 3.0 | air | 10.0 | 1.27E−03 |
|  | 2 | F | −60.2 | 3.0 | germanium | 12.7 | 0 |
|  |  | B | −47.1 | 0.5 | air | 12.7 | 0 |

TABLE 3-continued

| Group | Element | Surface | Radius | Thickness | Material | Semi-diameter | Conic |
|---|---|---|---|---|---|---|---|
| 2 | 1 | F | −382.1 | 3.0 | germanium | 12.7 | 0 |
|  |  | B | −140.2 | 0.5 | air | 12.7 | 0 |
|  | 2 | F | −114.9 | 3.0 | zinc selenide | 12.7 | 0 |
|  |  | B | 104.3 | 0.5 | air | 12.7 | 0 |
|  | 3 | F | 105.3 | 3.0 | germanium | 12.7 | 0 |
|  |  | B | 182.1 | 24.0 | air | 12.7 | 0 |
| 3 | 1 | F | 597.2 | 2.2 | germanium | 12.7 | 0 |
|  |  | B | infinity | 194.2 | air | 12.0 | 0 |
| — |  | Image | — | 0.0 | — | — | — |

Figure 3C:
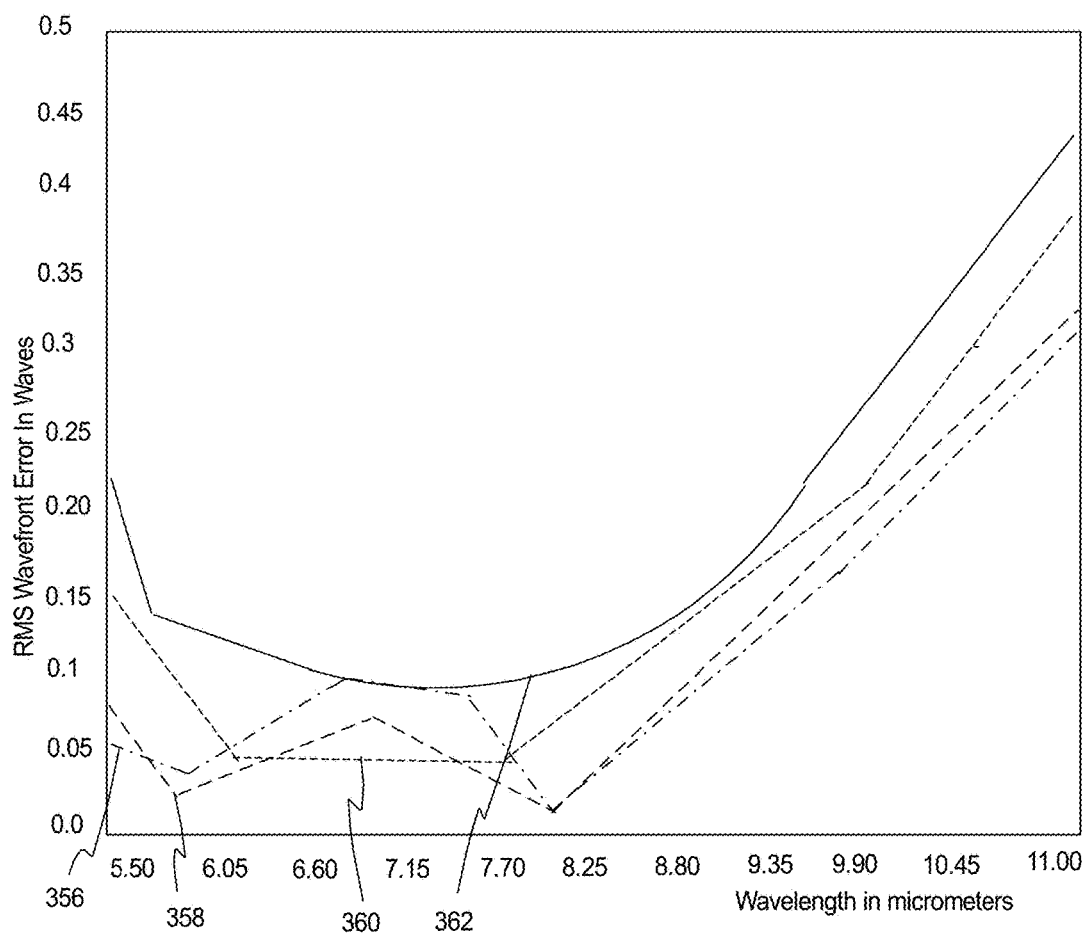
FIG. 3C illustrates RMS wavefront error in units of waves versus wavelength in micrometers for the objective lens assembly of FIGS. 3A and 3B.

FIG. 3C is a graph that illustrates the performance of the objective lens assembly 310 described above and illustrated in FIGS. 3A and 3B. FIG. 3C illustrates simulated data that was generated using an optical and illumination design software. More specifically, FIG. 3C illustrates RMS wavefront error in units of waves (vertical axis) versus wavelength in micrometers (horizontal axis) for the objective lens assembly 310 described above and illustrated in FIGS. 3A and 3B. The graph includes a separate curve for four different field positions, namely (i) curve 356 for on-axis field position; (ii) curve 358 for a field position of −0.125 millimeters (radial axis offset of −0.125 millimeters); (iii) curve 360 for a field position of −0.250 millimeters (radial axis offset of −0.250 millimeters); and (iv) curve 362 for a field position of −0.325 millimeters (radial axis offset of −0.325 millimeters). As illustrated in FIG. 3C, the RMS wavefront error of the objective lens assembly 10 will vary according to field position and wavelength.

As illustrated in FIG. 3C, the RMS wavefront error is less than 0.5 waves for the entire 5.5 to 11 micrometer range. Additionally, it should be noted that each curve 356, 358, 360, 362 has a minimum RMS wavefront error at a specific wavelength in the 5.5 to 11 micrometer range. Thus, as provided above, the RMS wavelength error can again be adjusted by adjusting the front separation distance "a".

Figure 3D:
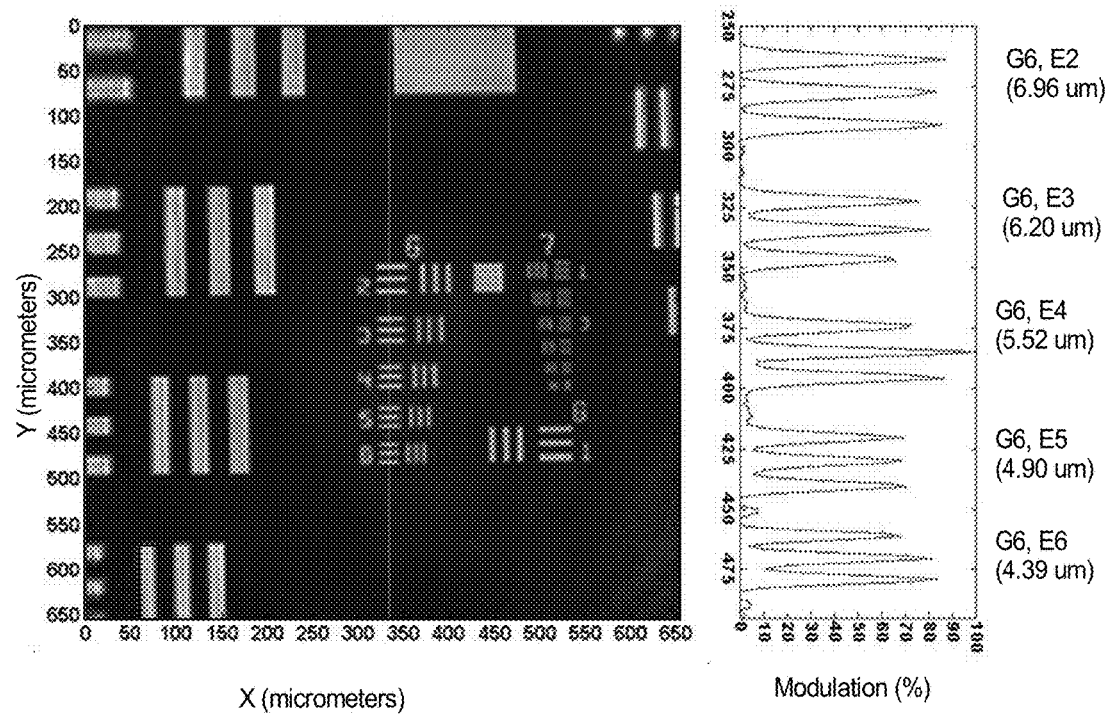
FIG. 3D illustrates actual test result of an infrared image.

FIG. 3D illustrates actual test result of an infrared image of a USAF1951 resolution test target using the 6-element 0.7NA 12.5× lens assembly 310 prescribed in Table 3 with infrared laser illumination at 1555 cm-1 (6.43 um). The test target consists of groups of lithographically defined vertical and horizontal chrome bars of varying widths and spacing on soda lime glass substrate. The image demonstrates that the infrared optical assembly prescribed in Table 3 can resolve features down to 4.39 um over a field of view of 650 um. This result demonstrates that the performance of the lens assembly exceeds the design specification by yielding an effective numerical aperture, NA_effective, of 0.9, which was calculated using the formula NA_effective=0.61*lambda/4.39.

Figure 4A:
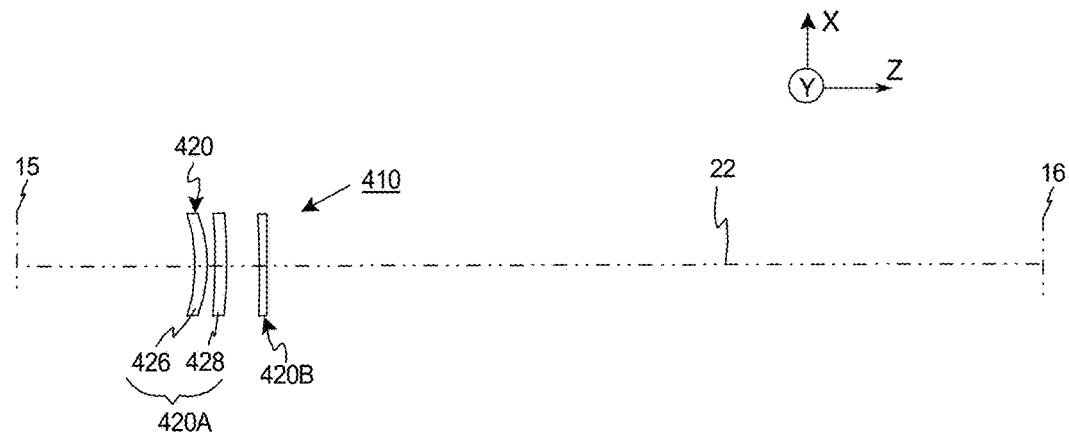
FIG. 4A is a simplified side view, of another embodiment of an objective lens assembly having features of the present invention.

Yet another, non-exclusive example of an objective lens assembly 410 is illustrated in FIG. 4A, with the object plane 15 and the image plane 16. In this embodiment, the objective lens assembly 410 is somewhat similar to the lens assembly 10 described above. However, in this embodiment, the objective lens assembly 310 has a numerical aperture of 0.15, and a magnification of 4×.

In the embodiment illustrated in FIG. 4A, the objective lens assembly 410 includes three spaced apart optical lens elements 420 which can be grouped into two groups, namely (i) a front lens group 420A that contains the first two elements 420; and (ii) a rear lens group 420B that includes a single lens element 420. The front lens group 420A is closer than the back lens group 420B to the object plane 15, while the front lens group 420A is farther than the back lens group 420B to the image plane 16.

For convenience, moving left to right in FIG. 4A (object-wise to imagewise), the lens elements 420 of (i) the front lens group 420A can be labeled as a front, first lens element 426, and a front, second element 428; and (ii) the single lens element 420 of the rear lens group 420B.

Figure 4B:
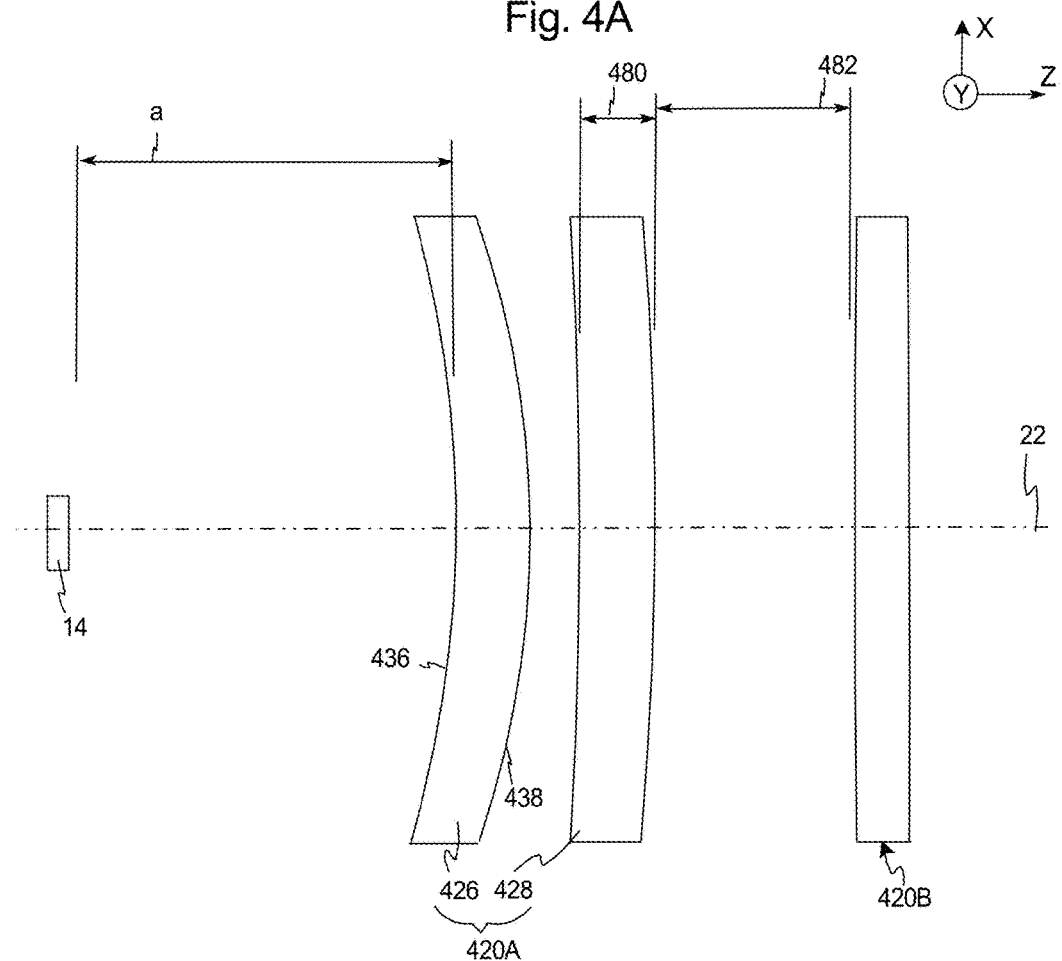
FIG. 4B is a larger, simplified side view, of a portion of the objective lens assembly of FIG. 4A.

FIG. 4B is a larger, simplified side view of a portion of the objective lens assembly 410 from FIG. 4A including (i) the lens elements 426, 428 of the front lens group 320A; and (ii) the one lens elements 420 of the rear lens group 420B, and (iii) the object 14. Each of the lens elements 420 includes a forward surface 436 and a rearward surface 438. Further, each lens 420 has a lens thickness 480 (only one is shown) and a separation distance 482 (only one is shown) separates adjacent lens elements 420. Further, the forward surface 436 of the front first lens element 426 is spaced apart a front separation distance "a" along the optical axis 22 from the object 14.

Table 4 below is one, non-exclusive lens prescription for the objective lens assembly 410 of FIGS. 4A and 4B:

TABLE 4

| Group | Element | Surface | Radius | Thickness | Material | Semi-diameter | Conic |
|---|---|---|---|---|---|---|---|
| — | — | object | — | 45 | — | — | — |
| 1 | 1 | F | −45.0 | 3.0 | germanium | 12.7 | 0 |
|   |   | B | −38.4 | 2.0 | air | 12.7 | 0 |
|   | 2 | F | −194.6 | 3.0 | germanium | 12.7 | 0 |
|   |   | B | −148.3 | 8.0 | air | 12.7 | 0 |
| 2 | 1 | F | 597.2 | 2.2 | germanium | 12.7 | 0 |
|   |   | B | infinity | 196.3 | air | 12.7 | 0 |
| — | — | image | N/A | 0.0 | — | — | — |

Figure 4C:
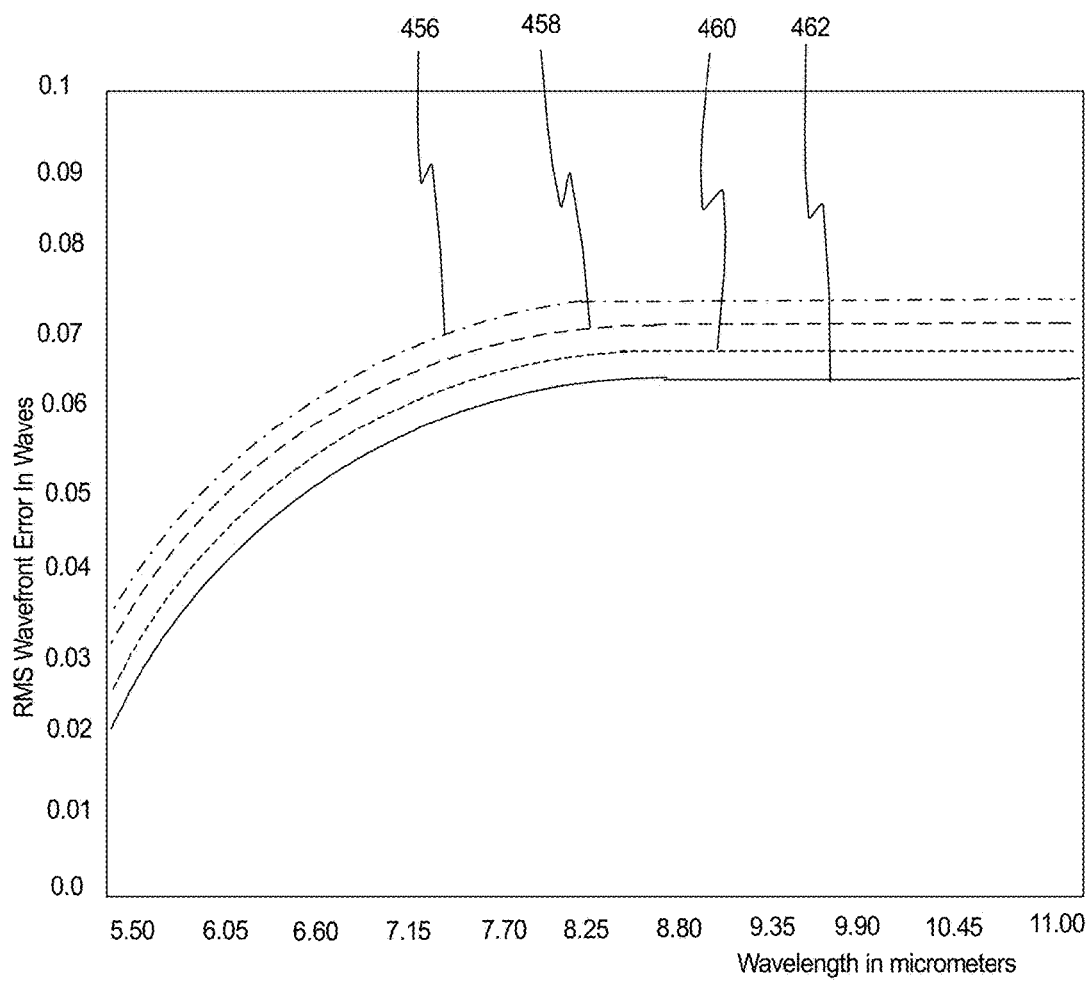
FIG. 4C illustrates RMS wavefront error in units of waves versus wavelength in micrometers for the objective lens assembly of FIGS. 4A and 4B.

FIG. 4C is a graph that illustrates the performance of the objective lens assembly 410 described above and illustrated in FIGS. 4A and 4B. FIG. 4C illustrates simulated data that was generated using an optical and illumination design software. More specifically, FIG. 4C illustrates RMS wavefront error in units of waves (vertical axis) versus wavelength in micrometers (horizontal axis) for the objective lens assembly 410 described above and illustrated in FIGS. 4A and 4B. The graph includes a separate curve for four different field positions, namely (i) curve 456 for on-axis field position; (ii) curve 458 for a field position of −0.5 millimeters (radial axis offset of −0.5 millimeters); (iii) curve 460 for a field position of −0.75 millimeters (radial axis offset of −0.75 millimeters); and (iv) curve 462 for a field position of −1 millimeters (radial axis offset of −1 millimeters). As illustrated in FIG. 4C, the RMS wavefront error of the objective lens assembly 10 will vary according to field position and wavelength.

As illustrated in FIG. 4C, the RMS wavefront error is less than 0.8 waves for the entire 5.5 to 11 micrometer range. Additionally, it should be noted that each curve 456, 458, 460, 462 has a minimum RMS wavefront error at a specific wavelength in the 5.5 to 11 micrometer range. Thus, as provided above, the RMS wavelength error can again be adjusted by adjusting the front separation distance "a".

Figure 5:
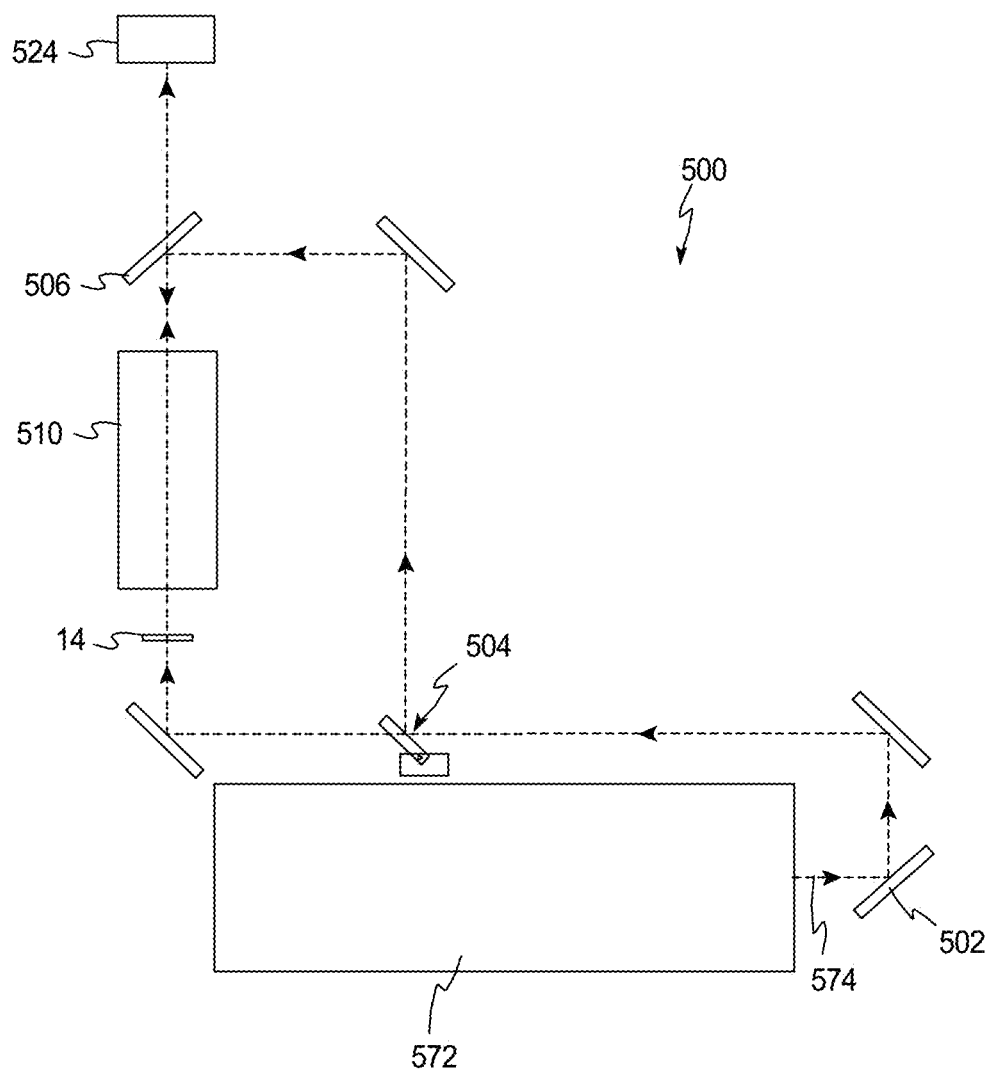
FIG. 5 is a simplified illustration of an assembly having features of the present invention.

FIG. 5 is a simplified illustration of an assembly 500 having features of the present invention. More specifically, the assembly 500 illustrated in FIG. 5 is a mid-infrared, imaging microscope that utilizes an objective lens assembly 510 having features of the present invention. In particular, the imaging microscope 500 can be used to analyze and evaluate the various properties of the object 14. For example, in one embodiment, the imaging microscope 500 is an infrared imaging microscope that uses tunable laser radiation to interrogate one or more objects (samples) 14 in order to reveal properties of the sample 14 that are less apparent under ordinary illumination.

The sample 14 can be a variety of things, including human tissue, animal tissue, plant matter, explosive residues, powders, liquids, solids, inks, and other materials commonly analyzed using ordinary or specialized microscopes. More particularly, in certain non-exclusive applications, the sample 14 can be human tissue and the imaging microscope 500 can be utilized for rapid screening of the tissue sample 14 for the presence of cancerous cells and/or other health related conditions; and/or the imaging microscope 500 can be utilized in certain forensic applications such as rapid screening of the sample 14 for the presence of explosive residues and/or other dangerous substances. Additionally, when positioned substantially within the imaging microscope 500 for purposes of analysis, the sample 14 can be present by itself, or the sample 14 can be held in place using one or more slides, e.g., infrared transparent slides.

Further, the sample 14 can be sufficiently thin to allow study through transmission of an illumination beam, e.g., an infrared illumination beam, through the sample 14 (i.e. in transmission mode), or the sample 14 can be an optically opaque sample that is analyzed through reflection of an illumination beam, e.g., an infrared illumination beam, by the sample (i.e. in reflection mode). For example, in the embodiment illustrated in FIG. 5, the imaging microscope 500 can alternatively be utilized in both transmission mode and reflection mode.

The design of the imaging microscope 500 can be varied. In the embodiment illustrated in FIG. 5, the imaging microscope 500 includes (i) a laser source 572 that generates a laser beam 574, (ii) a plurality of spaced apart beam steerers 502 that steer the beam 574, (iii) an illumination switch 504 that is controlled to either direct the beam 574 at the object 14 in transmission mode or reflection mode, (iv) the objective lens assembly 510 having features of the present invention, (v) a beamsplitter 506, and (vii) a light sensing device 524 that captures an infrared image of the object 14. It should be noted that the imaging microscope 500 can be designed with more or fewer components than are illustrated in FIG. 5, and/or the components can be organized in another fashion than illustrated in FIG. 5. For example, the microscope 500 can include multiple position lens turrent (not shown) that include one or more mid-infrared objective lens assemblies having features of the present invention, and/or one or more objective lens assemblies that work outside the mid-infrared spectral range.

In one embodiment, the laser source 572 emits a temporally coherent, illumination beam 574 that is usable for illuminating and analyzing the sample 14 in transmission mode and/or in reflection mode. In certain embodiments, the laser source 572 is a mid-infrared (MIR) beam source that generates the illumination beam 34 that is in the mid infrared ("MIR") range spectrum between approximately two to twenty microns (2-20 μm). The laser source 572 can be a pulsed laser and/or a continuous wave (CW) laser. Further, the laser source 572 can include one or more individual lasers that span a portion or all of the desired mid-infrared spectral range. Further, each laser can be an external cavity laser that includes a gain medium, a cavity optical assembly, an output optical assembly, and a wavelength dependent ("WD") feedback assembly (e.g. a movable grating). In one, non-exclusive embodiment, the gain medium directly emits the respective beam 574 without any frequency conversion. As non-exclusive examples, the gain medium can be a Quantum Cascade (QC) gain medium, an Interband Cascade (IC) gain medium, or a mid-infrared diode. Alternatively, another type of gain medium can be utilized. In other embodiments, the laser source 572 is an incoherent infrared radiation source such as a glow bar or a quasi-coherent source such as that produced by a filtered synchrotron.

The light sensing device 724 can be infrared camera that includes an image sensor that senses infrared light and converts the infrared light into an array of electronic signals that represents an image of the sample. In certain embodiments, the image sensor includes a two dimensional array of photosensitive elements (pixels) (e.g. a focal plane array (FPA)) that are sensitive to the wavelength of the illumination beam 574. The spacing between the pixel elements is referred to as the pitch of the array. For example, if the illumination beam 574 is in the MIR range, the image sensor is a MIR imager. More specifically, if the illumination beam 574 is in the infrared spectral region from two to twenty μm, the image sensor is sensitive to the infrared spectral region from two to twenty μm. Non-exclusive examples of suitable infrared image sensors include (i) vanadium oxide (VOX) microbolometer arrays such as the FPA in the FLIR Tau 640 infrared camera that are typically responsive in the seven to fourteen μm spectral range; (ii) mercury cadmium telluride (HgCdTe or MCT) arrays such as those in the FLIR Orion SC7000 Series cameras that are responsive in the 7.7 to 11.5 μm spectral range; (iii) indium antimonide (InSb) arrays such as those in the FLIR Orion SC7000 Series cameras that are responsive in the 1.5 to 5.5 μm spectral range; (iv) indium gallium arsenide (InGaAs); (v) uncooled hybrid arrays involving VOx and other materials from DRS that are responsive in the two to twenty μm spectral range; or (vi) any other type of image sensor that is designed to be sensitive to infrared light in the two to twenty μm range and has electronics allowing reading out of each element's signal level to generate a two-dimensional array of image information. Additionally, the imaging microscope 12 can further include and/or be coupled to a processing device (not shown) that includes one or more processors and/or storage devices. For example, the processing device can receive information from the pixels of the IR camera and generate the image of the sample. Further, the processing device can control the operation of the laser source 14.

The lens elements described here are made of special materials suitable for use with the mid-infrared spectral range. A common material which may be used for mid-IR lenses is zinc selenide, or ZnSe. ZnSe is also suitable for use with configurations presented herein. ZnSe may be used to form an aspherical lens in a special "diamond turning" process. While excellent results have been obtained this way, diamond turning can be expensive and sometimes results in imperfect devices. ZnSe material is also expensive and has some additional drawbacks. In certain cases materials other than ZnSe may be preferred. Materials sometimes and herein known as "chalcogenides" may also be used to form lenses suitable for use with mid-IR wavelengths. Chalcogenides are particularly useful because these materials may sometimes be molded. For lenses having complex surface shapes, for example some aspheric lenses, molding is a good option for inexpensive manufacture. One preferred type of material useful for forming these lenses is sometimes referred to by its brand name "AMTIR-1".

While a number of exemplary aspects and embodiments of the invention have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A mid-infrared objective lens assembly for gathering mid-infrared light from an object positioned at an object plane and forming the mid-infrared light at an image plane, the objective lens assembly comprising:
   a plurality of spaced apart, refractive lens elements that operate in a mid-infrared spectral range, the plurality of lens elements including an aplanatic first lens element that is closest to the object and that is positioned on an optical axis, the first lens element having a forward surface that faces the object and a rearward surface that faces away from the object; wherein the forward surface of the first lens element has a forward center of curvature; and wherein the first lens element is positioned so that the forward center of curvature is positioned on the optical axis, and is approximately at the object plane.

2. The objective lens assembly of claim 1 wherein the plurality of lens elements are spaced apart along the optical axis and wherein the first lens element has a working distance of less than one hundred millimeters.

3. The objective lens assembly of claim 1 wherein the plurality of lens elements further includes at least a second lens element and a third lens element; wherein at least two of the lens elements are made of different materials, and wherein each of the lens elements is made of material that is selected from a group that includes germanium, zinc sulfide, zinc selenide, and silicon.

4. The objective lens assembly of claim 1 wherein the plurality of lens elements further includes at least a second lens element and a third lens element; wherein at least three of the lens elements are made of different materials, and wherein each of the lens elements is made of material that is selected from a group that includes germanium, zinc sulfide, zinc selenide, and silicon; wherein the first lens element is made of a first material having an infrared Abbe number that is greater than an infrared Abbe number for a second material of the second lens element.

5. The objective lens assembly of claim 1 wherein the plurality of lens elements are arranged to include a front lens group and a rear lens group, the front lens group including the first lens element and being closer than the rear lens group to the object, the front lens group be corrected for infinite image conjugate.

6. The objective lens assembly of claim 1 wherein the rearward surface of the first lens element has a radius of curvature R that approximately satisfies the aplanatic condition as defined by the expression:

$$R=-(\eta/(\eta+\eta'))*L$$

where η is the index of refraction of the first lens element, η' is the index of refraction of the medium surrounding the lens element, and L is the physical distance from the vertex of the rearward surface and the on-axis object point which is the sum of the distance from the on-axis object point and the vertex of the forward surface of the first element and the center thickness of the first lens element.

7. An assembly including the objective lens assembly of claim 1, wherein the center thickness, Lc, of each lens elements of the objective lens assembly adheres to the formula: Lc>1/(4*η) measured in centimeters, where n is the average index of refraction over the mid-infrared operating band of the lens assembly.

8. The objective lens of claim 1 wherein the objective lens assembly has a RMS wavefront error of less than approximately 0.5 waves over a wavenumber range of approximately 5.5 micrometers in the mid-infrared spectral range and over a field of view between 100 micrometers up to 2 millimeters.

9. An assembly including the objective lens assembly of claim 1, a mover assembly that moves at least one of the object and the front lens element to adjust a front separation distance between the forward surface of the first lens element along the optical axis; and a control system that controls the mover assembly to selectively adjust the front separation distance to reduce RMS wavefront error.

10. The assembly of claim 9, further comprising a mid-infrared laser that directs a laser beam that is within the mid-infrared spectral range at the object; wherein the control system controls the mover assembly to selectively adjust the front separation distance based on a wavelength of the laser beam in order to minimize RMS wavefront error.

11. An assembly for analyzing an object, the assembly comprising:
a mid-infrared objective lens assembly that gathers mid-infrared light from the object and forms the mid-infrared light at an image plane, the objective lens assembly including a plurality of spaced apart, refractive lens elements that operate in a mid-infrared spectral range, the plurality of lens elements including a first lens element that is closest to the object, the first lens element having a forward surface that faces the object and a rearward surface that faces away from the object;
a mover assembly that moves at least one of the object and the first lens element to adjust a front separation distance between the object and the first lens element along an optical axis; and
a control system that controls the mover assembly to selectively adjust the front separation distance to reduce root mean square wavefront error.

12. The assembly of claim 11 wherein the forward surface of the first lens element has a radius of curvature that is negative, wherein the first lens element has a working distance of less than one hundred millimeters; and wherein the plurality of lens elements are designed and arranged so that a ratio of a magnification factor of the lens assembly to a numerical aperture of the lens assembly is less than thirty.

13. The assembly of claim 11 wherein the front separation distance is approximately equal to a magnitude of the radius of curvature of the forward surface of the first lens element.

14. The assembly of claim 11 wherein the forward surface of the first lens element has a forward center of curvature; and wherein the first lens element is positioned so that the forward center of curvature is positioned on the optical axis, and is approximately at the object plane.

15. The assembly of claim 11 wherein the plurality of lens elements further includes at least a second lens element and a third lens element; wherein at least two of the lens elements are made of different materials, and wherein each of the lens elements is made of material that is selected from a group that includes germanium, zinc sulfide, zinc selenide, and silicon.

16. The assembly of claim 11 wherein the plurality of lens elements further includes at least a second lens element and a third lens element; wherein at least three of the lens elements are made of different materials, and wherein each of the lens elements is made of material that is selected from a group that includes germanium, zinc sulfide, zinc selenide, and silicon; wherein the first lens element is made of a first material having an infrared Abbe number that is greater than an infrared Abbe number for a second material of the second lens element.

17. The assembly of claim 11 wherein the plurality of lens elements are arranged to include a front lens group and a rear lens group, the front lens group including the first lens element and being closer than the rear lens group to the object, the front lens group be corrected for infinite image conjugate; wherein the rear lens group includes a first rear lens element and a second rear lens element that are spaced apart, the rear lens elements being designed to achieve anomalous dispersion such that the effective focal length of the rear lens group decreases with increasing wavelength.

18. The assembly of claim 11 further comprising a mid-infrared laser that directs a laser beam that is within the mid-infrared spectral range at the object, and a light sensing device positioned at the image plane.

19. The assembly of claim 18 wherein the control system controls the mover assembly to selectively adjust the front separation distance based on a wavelength of the laser beam in order to minimize RMS wavefront error.

20. The assembly of claim 11 wherein the control system controls the mover assembly to selectively adjust the front separation distance so that the objective lens assembly has a root mean square wavefront error of less than approximately 0.5 waves over a wavenumber range of approximately 5.5 micrometers in the mid-infrared spectral range and over a field of view between 100 micrometers up to 2 millimeters.

21. An assembly for analyzing an object, the assembly comprising:
a stage that retains the object at an object plane;
a mid-infrared laser that directs a laser beam that is within the mid-infrared spectral range at the object;
a mid-infrared objective lens assembly that gathers mid-infrared light from the object and forms the mid-infrared light at an image plane, the objective lens assembly including a plurality of spaced apart, refractive lens elements that operate in a mid-infrared spectral range, the plurality of lens elements including a first lens element that is closest to the object, the first lens element having a forward surface that faces the object and a rearward surface that faces away from the object;
a light sensing device positioned at the image plane;
a mover assembly that moves at least one of the object and the first lens element to adjust a front separation distance between the object and the first lens element along an optical axis; and
a control system that controls the mover assembly to selectively adjust the front separation distance based on a wavelength of the laser beam.

22. The assembly of claim 21 wherein the forward surface of the first lens element has a radius of curvature that is negative, wherein the first lens element has a working distance of less than one hundred millimeters; and wherein the plurality of lens elements are designed and arranged so that a ratio of a magnification factor of the lens assembly to a numerical aperture of the lens assembly is less than thirty; wherein the first lens element is positioned so that a forward center of curvature of the first lens element is positioned on the optical axis, and is approximately at the object plane.

23. The assembly of claim 21 wherein the plurality of lens elements further includes at least a second lens element and a third lens element; wherein at least two of the lens elements are made of different materials, and wherein each of the lens elements is made of material that is selected from a group that includes germanium, zinc sulfide, zinc selenide, and silicon.

24. A mid-infrared, refractive objective lens assembly that gathers light in the mid-infrared spectral range from an object positioned at an object plane and focuses the light onto an image plane, the objective lens assembly having a RMS wavefront error of less than approximately 0.5 waves over a wavenumber range of approximately 5.5 micrometers in the mid-infrared spectral range and over a field of view between 100 micrometers up to 2 millimeters, the objective lens assembly having a working distance of less than one hundred millimeters.

* * * * *